US008150862B2

(12) United States Patent
Bhattacharya et al.

(10) Patent No.: US 8,150,862 B2
(45) Date of Patent: Apr. 3, 2012

(54) MULTIPLE RELATED EVENT HANDLING BASED ON XML ENCODED EVENT HANDLING DEFINITIONS

(75) Inventors: Partha Bhattacharya, Cupertino, CA (US); Sheng Chen, Stanford, CA (US); Hongbo Zhu, Fremont, CA (US)

(73) Assignee: Accelops, Inc., Santa Clara, CA (US)

( * ) Notice: Subject to any disclaimer, the term of this patent is extended or adjusted under 35 U.S.C. 154(b) by 201 days.

(21) Appl. No.: 12/722,416

(22) Filed: Mar. 11, 2010

(65) Prior Publication Data

US 2010/0235368 A1 Sep. 16, 2010

Related U.S. Application Data

(60) Provisional application No. 61/159,920, filed on Mar. 13, 2009.

(51) Int. Cl.
*G06F 17/30* (2006.01)

(52) U.S. Cl. ........ 707/755; 707/736; 707/E17.122; 707/E17.008; 714/100; 706/59; 712/28; 709/224; 719/318; 715/234; 717/143

(58) Field of Classification Search .................. None
See application file for complete search history.

(56) References Cited

U.S. PATENT DOCUMENTS

| | | | | |
|---|---|---|---|---|
| 6,167,448 A * | 12/2000 | Hemphill et al. | ........... | 709/224 |
| 6,226,675 B1 * | 5/2001 | Meltzer et al. | ........... | 709/223 |
| 6,606,620 B1 * | 8/2003 | Sundaresan et al. | ........... | 1/1 |
| 6,633,835 B1 | 10/2003 | Moran et al. | ........... | 702/190 |
| 6,718,371 B1 * | 4/2004 | Lowry et al. | ........... | 709/213 |
| 7,016,751 B2 * | 3/2006 | Nordquist et al. | ........... | 700/108 |
| 7,072,886 B2 * | 7/2006 | Salmenkaita et al. | ........... | 1/1 |
| 7,114,123 B2 * | 9/2006 | Chen et al. | ........... | 715/205 |
| 7,421,648 B1 * | 9/2008 | Davis | ........... | 715/234 |
| 7,698,694 B2 * | 4/2010 | Tjong et al. | ........... | 717/143 |
| 7,779,398 B2 * | 8/2010 | Tjong et al. | ........... | 717/143 |

(Continued)

FOREIGN PATENT DOCUMENTS

GB     2402520 A     12/2004

(Continued)

OTHER PUBLICATIONS

Wu et al, "XML Based RFID Event Management Framework", IEEE, 2006.*

(Continued)

*Primary Examiner* — Hung Le
(74) *Attorney, Agent, or Firm* — Morgan, Lewis & Bockius LLP

(57) ABSTRACT

In a method and system for collecting event information, XML documents specifying event parsing logic for respective groups of related events are loaded. Representations for the parsing logic contained in the plurality of XML documents are stored in one or more parsing trees. Events are received, including events in a plurality of groups of events. The received events are processed in accordance with the event parsing logic in the one or more parsing trees. The received events are also processed in accordance with stored program instructions that are independent of the parsing logic for the plurality of groups of events. Event information for the received events is stored. The stored event information includes information determined in accordance with the event parsing logic in at least one or more parsing trees.

26 Claims, 17 Drawing Sheets

U.S. PATENT DOCUMENTS

| | | | | |
|---|---|---|---|---|
| 2002/0169825 | A1* | 11/2002 | Hougland et al. | 709/203 |
| 2005/0206650 | A1 | 9/2005 | Nazzal | 345/594 |
| 2005/0289219 | A1 | 12/2005 | Nazzal | 709/203 |
| 2006/0117307 | A1* | 6/2006 | Averbuch et al. | 717/143 |
| 2007/0050704 | A1 | 3/2007 | Liu | 715/513 |
| 2007/0169038 | A1 | 7/2007 | Shankar et al. | 717/143 |
| 2007/0240034 | A1* | 10/2007 | Sthanikam et al. | 715/513 |
| 2007/0250823 | A1* | 10/2007 | Kono | 717/143 |
| 2008/0275916 | A1 | 11/2008 | Bohannon | 707/200 |
| 2009/0006944 | A1* | 1/2009 | Dang et al. | 715/234 |
| 2009/0063391 | A1 | 3/2009 | Zhou et al. | 706/59 |

FOREIGN PATENT DOCUMENTS

| | | |
|---|---|---|
| WO | WO 01/52496 A2 | 7/2001 |
| WO | WO 2004/061550 A2 | 7/2004 |

OTHER PUBLICATIONS

International Search Report and Written Opinion, PCT/US2010/039913, Apr. 28, 2011, 17 pgs.

International Search Report for International Application PCT/US2010/027124 dated Jul. 2, 2010, 11 pages.

* cited by examiner

Load a plurality of XML documents, each XML document specifying event parsing logic for a respective group of related events.

> The event parsing logic specified by a respective XML document includes conditional logic for conditionally revising information in the second event in accordance with information in the first event and second event. — 430

> The event parsing logic specified by a respective XML document includes conditional logic for conditionally supplementing the information extracted from the second event with information extracted from the first event in accordance with when a condition specified in the XML document is satisfied. — 432

> Each XML document specifies one or more event attributes to be included in the enhanced information for the second event when a predefined precondition is met. — 433

MULTIPLE RELATED EVENT HANDLING BASED ON XML ENCODED EVENT HANDLING DEFINITIONS

RELATED APPLICATIONS

This application claims priority to U.S. Provisional Application No. 61/159,920, filed Mar. 13, 2009, entitled "Multiple Related Event Handling Based on XML Encoded Event Handling," which is incorporated herein by reference in its entirety.

TECHNICAL FIELD

The disclosed embodiments relates generally to managing a computer system by processing event messages, produced by devices within the computer system, so as to determine the status of various aspects of the computer system.

BACKGROUND

Event messages produced by the devices in a computer system, such as a computer center or server system, are used to monitor and manage computer systems and networks. In addition to reporting the health of network devices, hosts and servers, event messages also report on activities, such as network traffic, observed by the devices in a computer system. Event messages can be correlated to detect system conditions and/or predict problems.

Typically, processing the event messages produced by the devices in a computer system requires programs customized to process each type of event, or each distinct group of events, produced by any of the system's devices. Customized programs (which generally must be compiled to generate executable code) are inefficient because they require frequent maintenance or revision to keep the programs compatible with new devices and updates to existing devices in the system. Using customized scripts instead of customized programs is impractical because scripts are typically slow to execute, as they are interpreted in real time, and therefore unlikely to be able to process event messages at the high rates that such messages are produced by the devices in large scale commercial computer systems.

SUMMARY

According to some embodiments, in a method and system for collecting event information, XML documents specifying event parsing logic for respective groups of related events are loaded, and representations of the event parsing logic contained in the XML documents are stored in one or more parsing trees. Events are received, including events in a plurality of groups of events. The received events in the plurality of group of events are processed in accordance with the event parsing logic in the one or more parsing trees. The received events in the plurality of group of events are processed in accordance with stored program instructions that are independent of the parsing logic for the plurality of group of events. Event information for the received events is stored. The stored event information includes information determined in accordance with event parsing logic in at least one of the one or more parsing trees.

According to some embodiments, in a method and system for collecting event information, XML documents specifying event parsing logic for respective groups of related events are loaded, and representations for the parsing logic contained in the XML documents are stored in one or more parsing trees. Events are received, including a first event and a second event. The second event is processed in accordance with the event parsing logic for a first group of events that includes both the first event and second event. The processing includes extracting information from the first event in accordance with the event parsing logic for the first group of events. The processing includes extracting information from the second event information in accordance with the event parsing logic for the first group of events. To produce enhanced information for the second event, a portion of the information extracted from the second event is supplemented with at least a portion of the information extracted from the first event, in accordance with the event parsing logic for the first group of events.

According to some embodiments, instructions to perform the aforementioned operations may be included in one or more modules stored in memory and configured for execution by one or more processors.

BRIEF DESCRIPTION OF THE DRAWINGS

FIGS. 4A-4F are flow chart diagrams for the process of generating and storing enhanced events, in accordance with some embodiments of the invention.

Like reference numerals refer to corresponding parts throughout the drawings.

DESCRIPTION OF EMBODIMENTS

Figure 1:
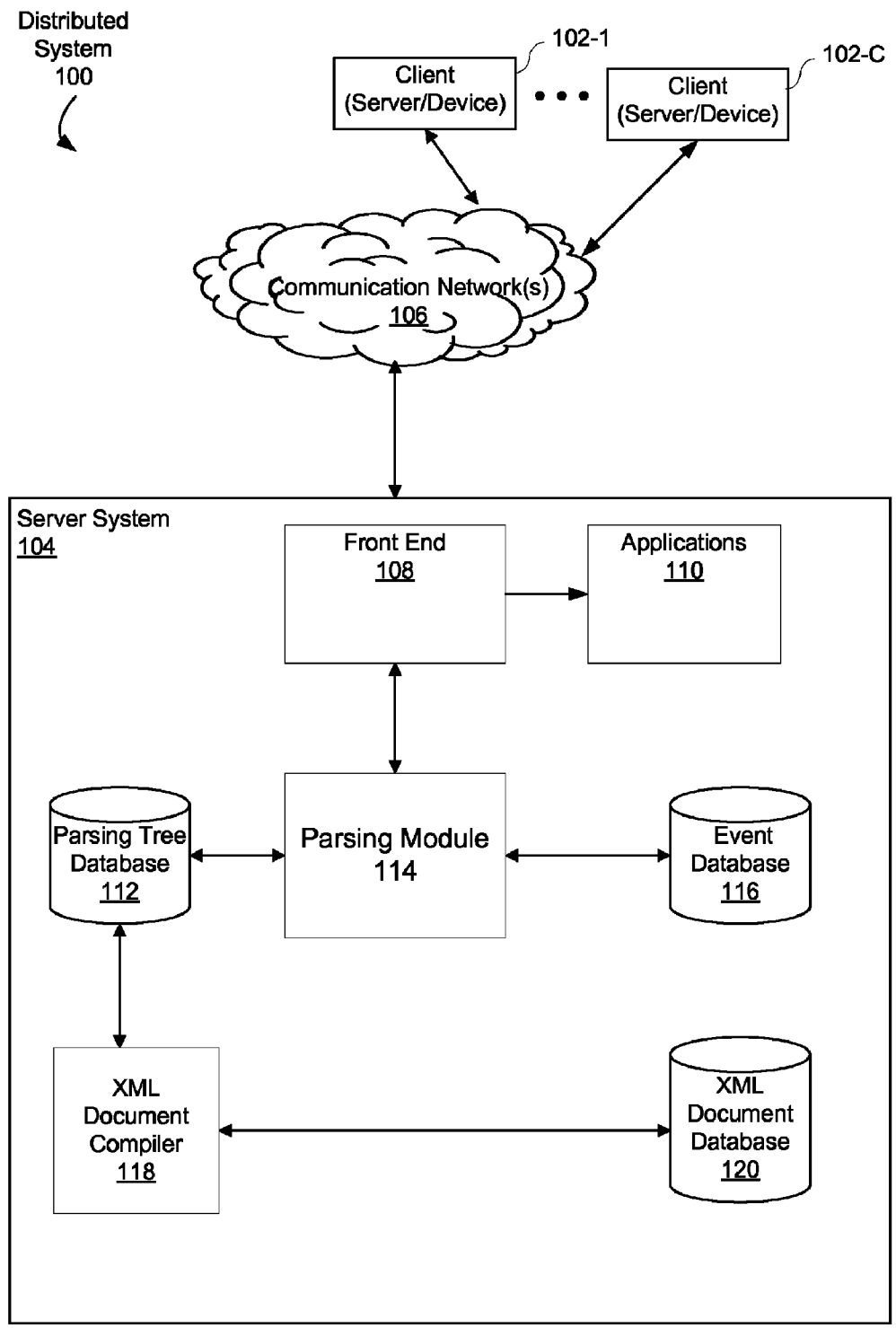
FIG. 1 is a block diagram illustrating a network, in accordance with some embodiments of the invention.

FIG. 1 is a block diagram of distributed system 100 for implementing some of the embodiments of the invention. One or more client or server devices 102 are connected to a communication network 106, which is also connected to a server system 104. The server system 104 can include a front end 108, applications 110, a parsing tree database 112, a parsing module 114, an event database 116, an XML document compiler 118 and an XML document database 120. The client/server devices 102 may be any suitable computer devices that are capable of connecting to the communication network 106, such as routers, switches, firewalls, relay servers, application servers, and servers for managing the operations of other computers of devices in the distributed system 100. Optionally, the client/server devices may include other computers, such as desktop and/or laptop computers used by managers of the distributed system 100. In some embodiments, the distributed system 100 is, or includes, a data center providing servers to a community of users, and thus includes application servers as well as the devices required to support those servers, management of the system 100, and communications with computers and devices outside the system 100.

The communication network 106 can be any local area network (LAN) and/or wide area network (WAN), such as an intranet, an extranet, or the Internet. It is sufficient that the communication network 106 provides communication capability between the clients/server devices 102 and the server system 104.

The term "events" is used herein to mean event messages, objects, or other data structures containing event information.

The front end 108 is configured to receive events from client/server devices 102. The events are processed by the parsing module 114 and stored in the event database 116. The parsing module 114 is configured to use parsing logic from one or more parsing trees, stored in parsing tree database 112, and received events from the front end 108 to produce enhanced event information. In some embodiments, the enhanced event information for the received events is stored in event database 116. The front end 108 is also configured to send at least some of the events to respective applications in the set of applications 110. In some embodiments, respective events in the received events are received from one or more of the client/server devices 102 described above.

The event database 116 stores event information including, for a respective event, the source IP address, destination IP address, source port, destination port, protocol, source Interface, destination interface, file name, source user name, and source computer name.

Applications 110 can include applications such as a network monitoring application that takes event information as input. In some embodiments, the applications 110 include an application that performs an analysis on events after they have been processed by the parsing module 114, to determine an operational status of a device or subsystem of the server system 104. In some embodiments, the applications 110 include an application that performs an analysis on received events to identify potential problems and/or predict future problems with the operational status of the server system 104. In some embodiments, the applications 110 include an application that performs an analysis on received events to determine the operational status of a network device 102 connected to the server system 104.

The XML document database 120 stores XML documents containing parsing logic for respective groups of related events. The XML document compiler 118 compiles the XML documents stored in the XML document database 120 to create one or more parsing trees to represent the event parsing logic contained in the XML documents. In some embodiments, the one or more parsing trees are stored in the parsing tree database 112. Alternately, or in addition, the one or more parsing trees are stored in memory (e.g., memory 506, FIG. 5) as one or more tree data structures utilized by the parsing module 114.

Figure 2:
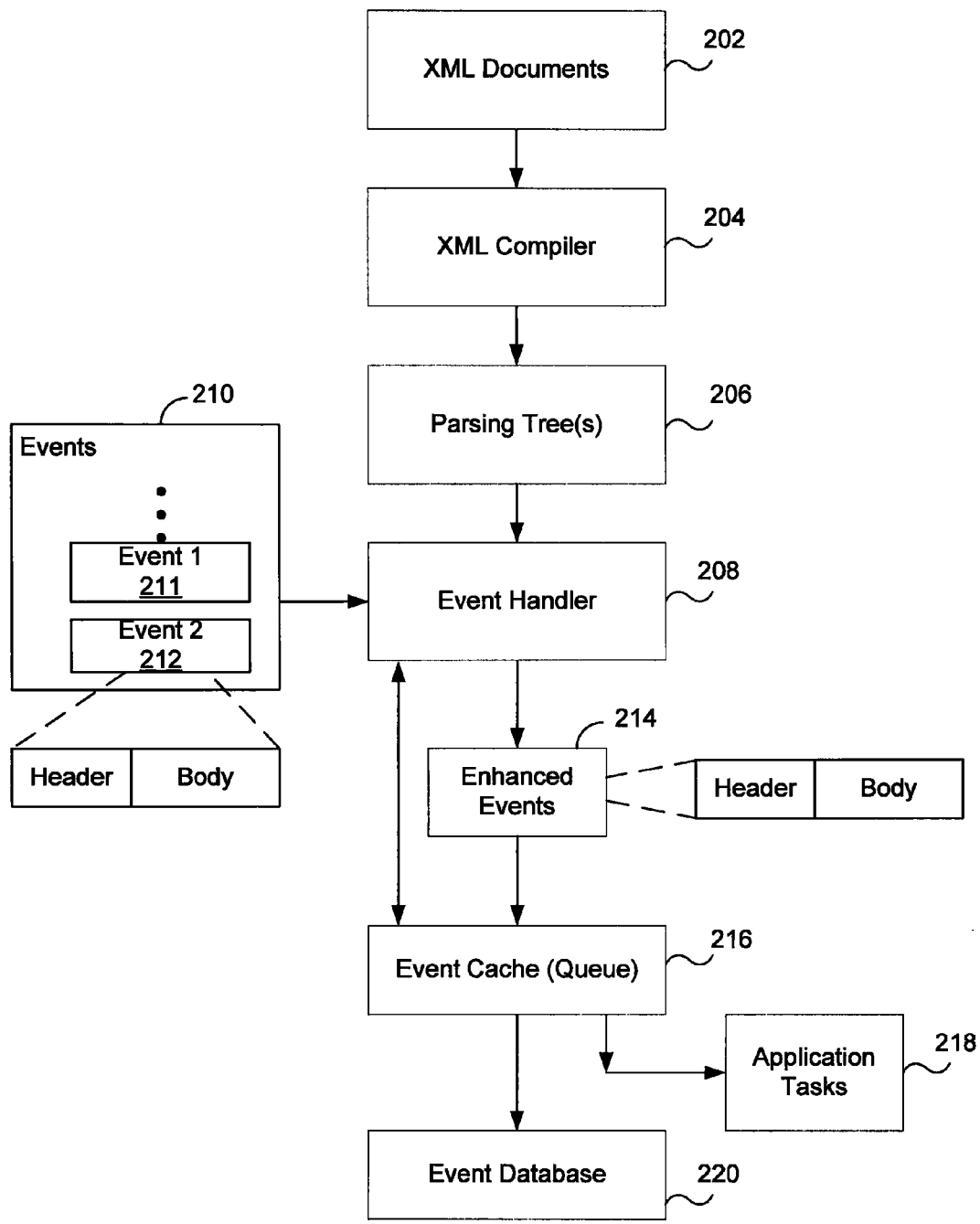
FIG. 2 is a flow chart diagram illustrating the process of generating and storing enhanced events in accordance with some embodiments of the invention.

FIG. 2 illustrates the process for parsing event information, in accordance to some embodiments of the invention. Initially, XML documents 202 are loaded into an XML compiler 204. In some embodiments, each XML document 202 specifies event parsing logic for a respective group of related events. Alternately, the event parsing logic for a respective group of related events may be specified by a plurality of XML documents, and in yet other embodiments the event parsing logic for two or more respective groups of related events may be specified by a single one of the XML documents 202.

The XML compiler 204 compiles the XML documents 202 into one or more parsing trees 206. The one or more parsing trees 206 include a representation of the event parsing logic in the XML documents 202. In some embodiments, each parsing tree contains a representation of the event parsing logic for one corresponding group of events (e.g., for events of a particular type), and thus a typical system includes many parsing trees. In an alternate embodiment, a single parsing tree is used to store the parsing logic for all the events for which parsing logic has been defined. It is noted that generation of the one or more parsing trees 206 precedes the processing of events, since the parsing logic for processing the events is specified by the parsing trees 206.

The event handler 208 receives a plurality of events 210 including a first event 211 and a second event 212. The event handler 208 processes the events 210 in accordance with the event parsing logic in the one or more parsing trees 206 to produce enhanced events 214. An enhanced event 214 contains information obtained from a corresponding received event, which has been supplemented with information from another related event. Alternately, an enhanced event 214 contains information obtained from a corresponding received event and information determined based at least in part on information obtained from a related event. For example, an enhanced event 214 may include a pair of values that have been swapped relative to their position in the corresponding received event. In another example, an enhanced event 214 includes a predefined value inserted into the enhanced event 214 when a predefined condition (e.g., an error condition, a completion condition, a security condition, etc.) is satisfied.

Typically, each event 211, 212 includes a header and a body, and the enhanced events 214 also each include a header and a body. Typically, the body of an enhanced event 214 includes information that is different from, or differently arranged, than in the body of a corresponding received event 211, 212.

The enhanced events 214 are placed in an event cache (queue) 216 that is accessible to application tasks 218 and an event database 220. From the event cache 216, the enhanced events 214 are sent to the event database 220 to be stored. In addition, at least some of the enhanced events 214 are sent to a respective application (110, FIG. 1), which performs a corresponding application task 218 on those enhanced events.

Tables 1, 2 and 3 contain generic, simplified and detailed examples of an XML file that corresponds to the parsing logic shown diagrammatically in FIGS. 3A-3D. In particular, "part 1" in Tables 1, 2 and 3 corresponds generally to the parsing tree 300 of FIG. 3A, "part 2" in Tables 1, 2 and 3 corresponds generally to the parsing tree shown in FIG. 3B for node 308, "part 3" in Tables 1, 2 and 3 corresponds generally to the parsing tree shown in FIG. 3C for node 303, and "part 4" in Tables 1, 2 and 3 corresponds generally to the parsing tree shown in FIG. 3D for node 312.

Figure 3A:
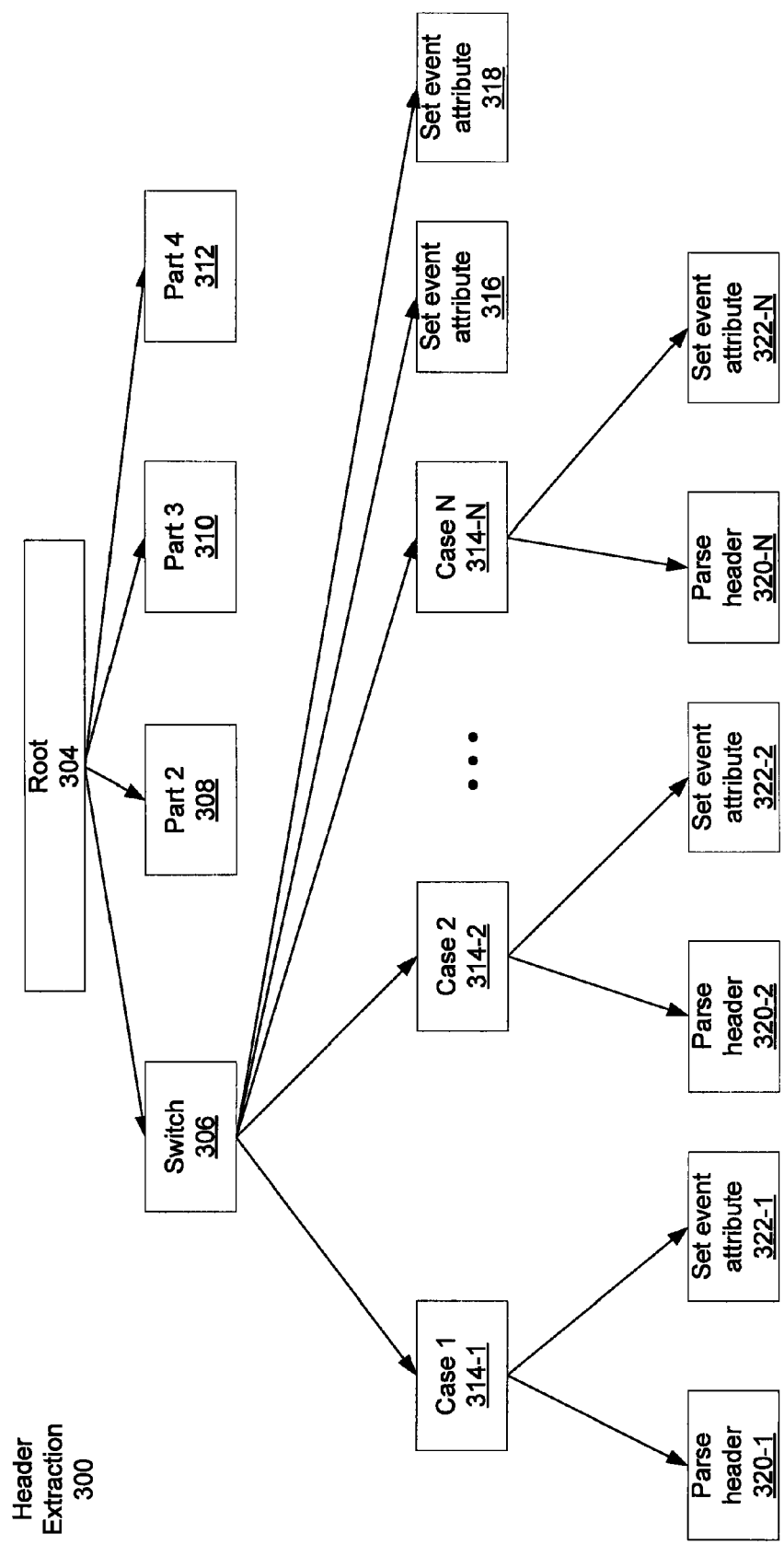
FIGS. 3A-3D are block diagrams illustrating a parsing code tree, in accordance with some embodiments of the invention.

FIG. 3A illustrates a first part of a parsing tree 300. The first part of the parsing tree extracts the header from an event, in accordance to some embodiments of the invention. A root node 304 has four children nodes, which are processed sequentially in the order that these nodes are presented in the parsing tree. The first child node 306, called a switch, distributes a received event to its children nodes 314-1 to 314-N, 316, 318 for sequential processing in the order of those nodes. Nodes 314-1 are case nodes, each of which is operative only if a data pattern is matched or other precondition defined by the case node is satisfied. When a respective case node 314-i is operative, the operations represented by its subnodes (e.g., 320-1, 322-1) are performed. In this example, the header of the event is parsed in accordance with a data pattern specified by the first subnode 320-i, and then one or more attributes of the event (e.g., a normalized date and time value associated with the event) are set in accordance with logic specified by the second node 322-i. After the case nodes 314 have been processed, two attribute setting nodes 316, 318 are processed so as to set attributes (e.g., event type and event action) of the received event in accordance with logic specified by those nodes. Each of the "set event attribute" nodes, when operative, produces supplemental or enhanced event information. In summary, in accordance with the event parsing logic shown in FIG. 3A, various attributes of the received event are set to as to form enhanced event information, based on which header pattern, if any, is found in the received event.

Figure 3B:
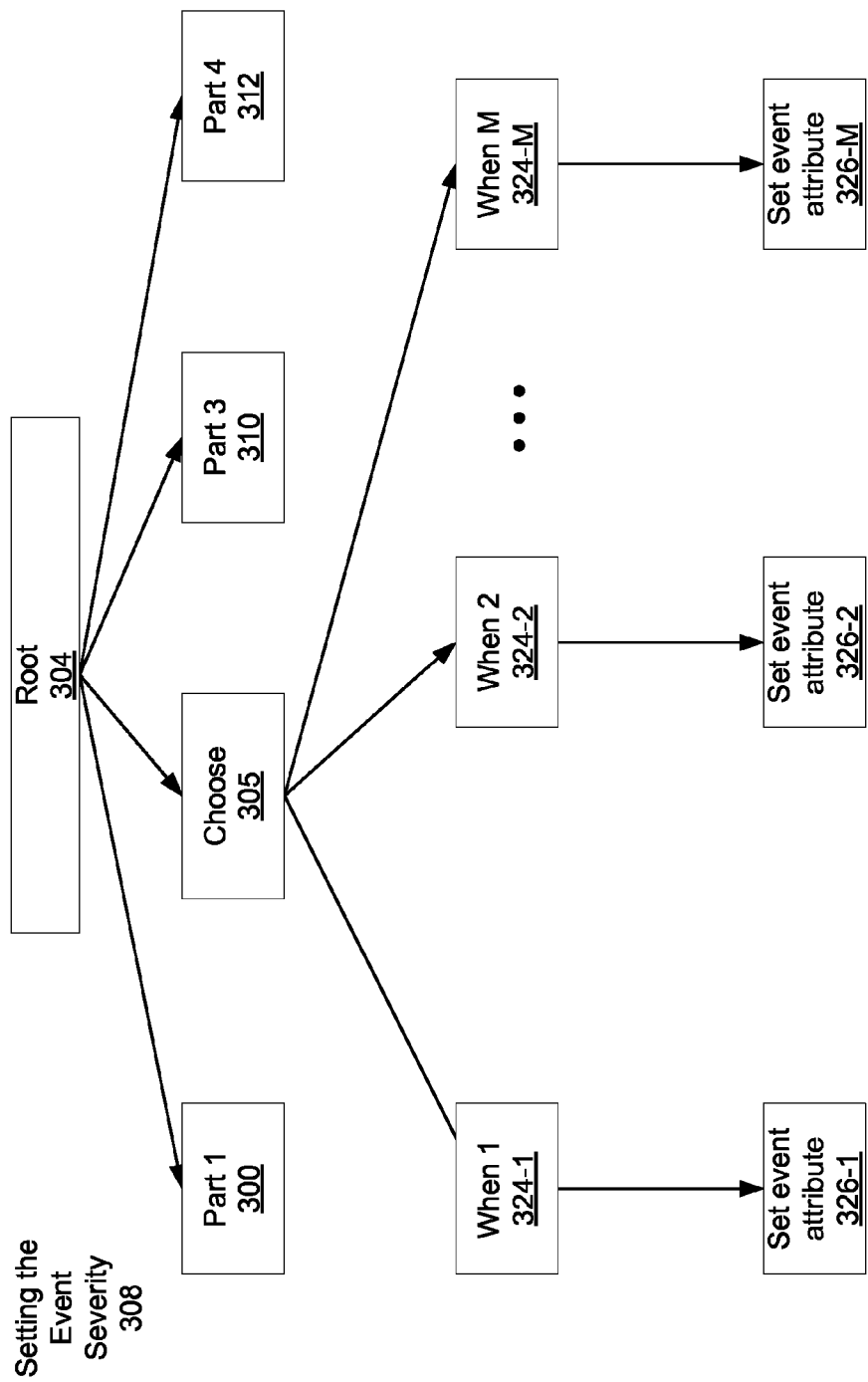

FIG. 3B illustrates a second part of the parsing tree that normalizes the event severity, in accordance to some embodiments of the invention. Initially, the "choose" node 305 is executed taking as input an event severity value. In some embodiments, the event severity value is extracted from the event type attribute of an event. For example, an event type of ASA-6-302013 has an event severity of 6.

The event severity value is tested at the execution of each "when" node 324. There is a "when" node for each possible or valid normalized value of the event severity value. For example, if the normalized values are low, medium and high then there are three "when" nodes 324. Alternatively, the normalization values can be expressed in any combination of numbers, letters or symbols.

Each "when" node 324 will contain parameters corresponding to a range of event severity values depending on the scale of the event severity and the number of nodes. For example, if scale of event severity is 1-7 and there are three normalization values, a low "when" node's 324 parameter could correspond to event severity values of 1 and 2. A medium "when" node's 324 parameter could correspond to event severity values of 3, 4 and the high "when" node's 324 parameter could correspond to the remaining event severity values of 5, 6, and 7.

Once executed, a "when" node 324 compares the event severity value with its parameters. If the event severity value falls within the range of values in the "when" node's parameters then a set event attribute node 326 is executed to assign the corresponding normalization value to the event. Using the example above, if the event severity is 6, the "when" node 324 corresponding to event severity values 5, 6 and 7 would execute the set event attribute of node 326 to set an event's severity level to medium.

Figure 3C:
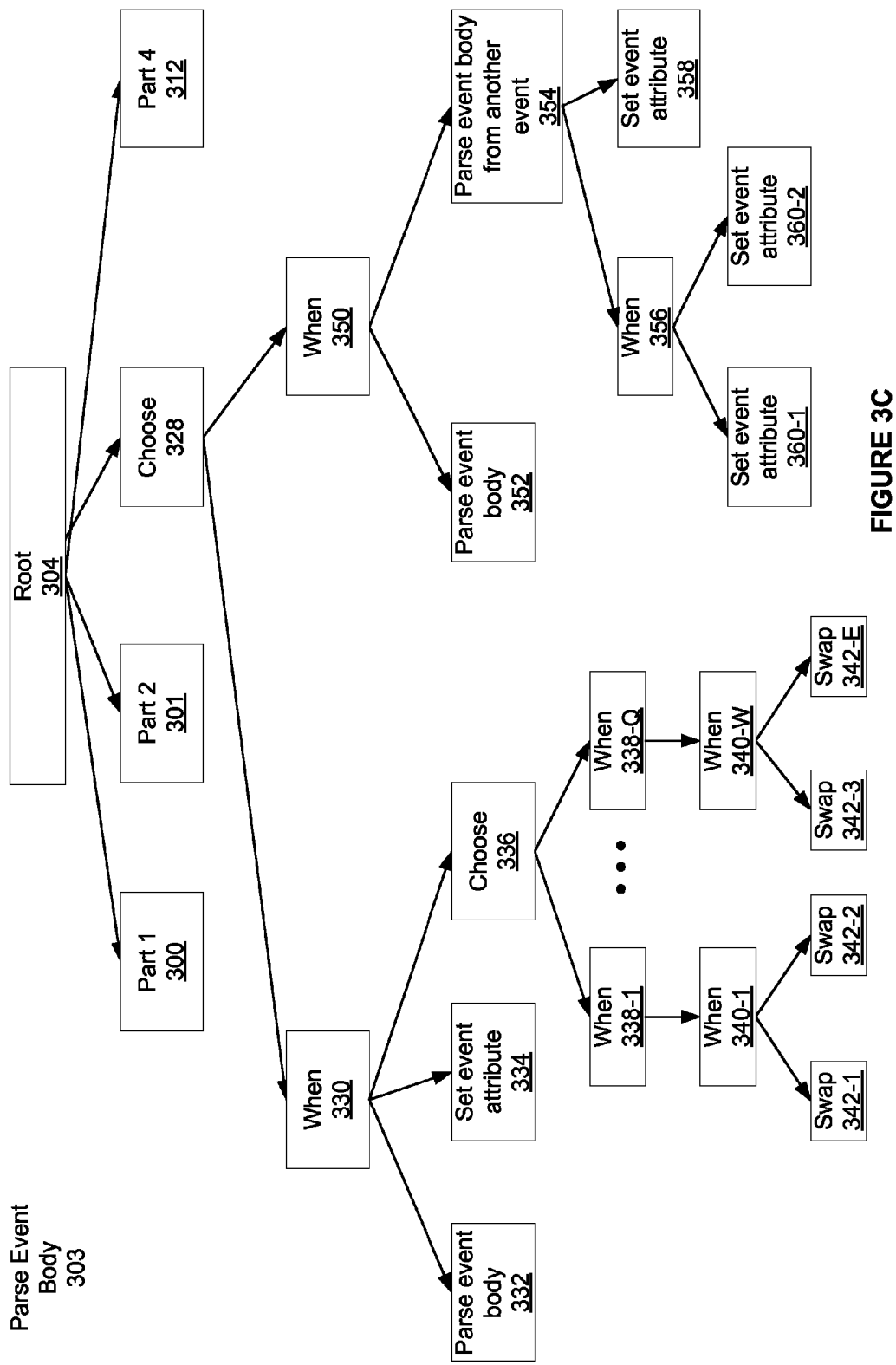

FIG. 3C illustrates a third part of the parsing tree, in accordance to some embodiments of the invention. The third part of the parsing tree parses the body from an event, in accordance to some embodiments of the invention. The first node 328 of the third part of the parsing, called a choose node, distributes a received event to its children nodes 330 and 350 for sequential processing in the order of those nodes. Nodes 330 and 350 are when nodes, each of which is operative only if a data pattern is matched or other precondition defined by the case node is satisfied.

When the when node 330 is operative, the operations represented by its subnodes (e.g., 332, 334,336) are performed. In this example, the body of the event is parsed in accordance with a data pattern specified by the first subnode 332, attributes of the event (e.g., source interface severity level, destination interface severity level) are compared according to logic specified by the second node 334, and then one or more attributes of the event (e.g., direction) are set in accordance with the logic specified by the second node 334. After the first two subnodes 332 and 334 are processed, the third subnode 336 distributes the attribute values set in the second subnode to its children 338-1 to 338-Q for sequential processing in the order of those nodes. The children nodes of node 338-1 swap certain attribute values (e.g., source and destination addresses and ports) when a predefined precondition (e.g., an inbound transmission condition, defined by node 338-1, and a severity level condition, defined by node 340-1) is satisfied. Similarly, the children nodes of node 338-Q swap certain attribute values (e.g., source and destination addresses and ports) when a predefined precondition (e.g., an outbound transmission condition, defined by node 338-Q, and a severity level condition, defined by node 340-W) is satisfied.

The subtree whose root is when node 350 conditionally supplements the information for an event with information from a related event. When node 350 is operative, the operations represented by its subnodes (e.g., 352, 354) are performed. In this example, the body of the event is parsed in accordance with a data pattern specified by the first subnode 352, and the event body of another related event is parsed by subnode 354. For example, child node 356 of subnode 354 may be used to search for a prior event having the same IP connection identifier as the event being parsed. When such a prior event is located, predefined event attributes of the event being parsed are set equal to attributes of the prior event at nodes 360-1 and 360-2. In addition, one or more attributes of the event being parsed are optionally set to values determined, for example, based on information extracted from the event itself, at child node 358 of subnode 354.

Figure 3D:
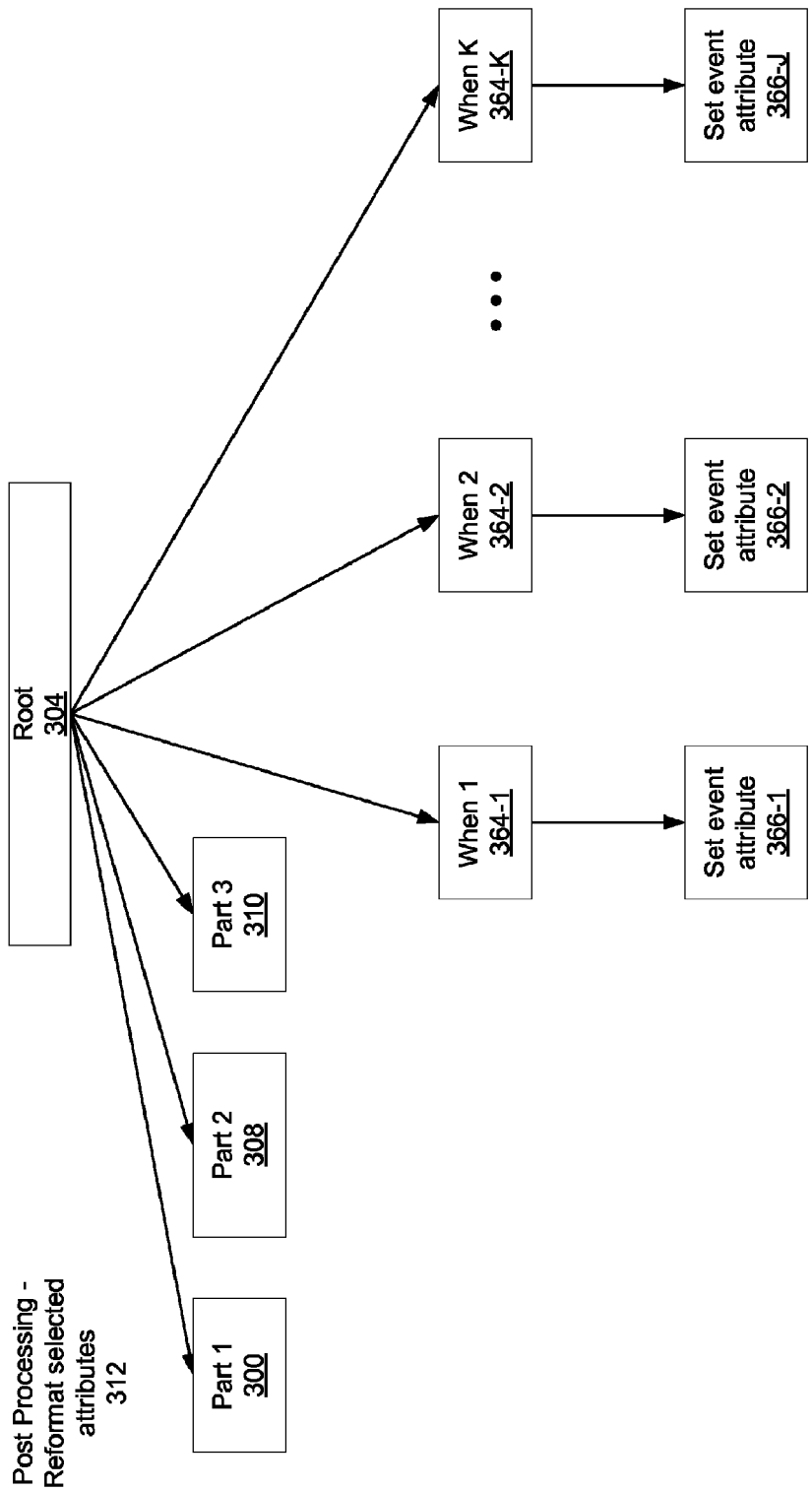

FIG. 3D illustrates a fourth part of the parsing tree which performs some post processing, in accordance to some embodiments of the invention. The post processing includes converting event attributes that are set as string values to numerical values. For example, the string value for an event attribute "protocol" set to "TCP" is converted from to a standard IRNA assigned numerical value.

There is a "when" node 364 corresponding to each different event attribute that will be converted. For example, if there are three different event attributes to be converted then there will be three different "when" nodes 364, each of which contains a condition that is satisfied when an input string of the received event matches a corresponding pattern. The set event attribute nodes 366 are each executed when the condition associated with the corresponding when node 364 is satisfied, thereby setting a corresponding attribute value of the event to a numerical value specified by the input string of the received event.

Figure 4A:
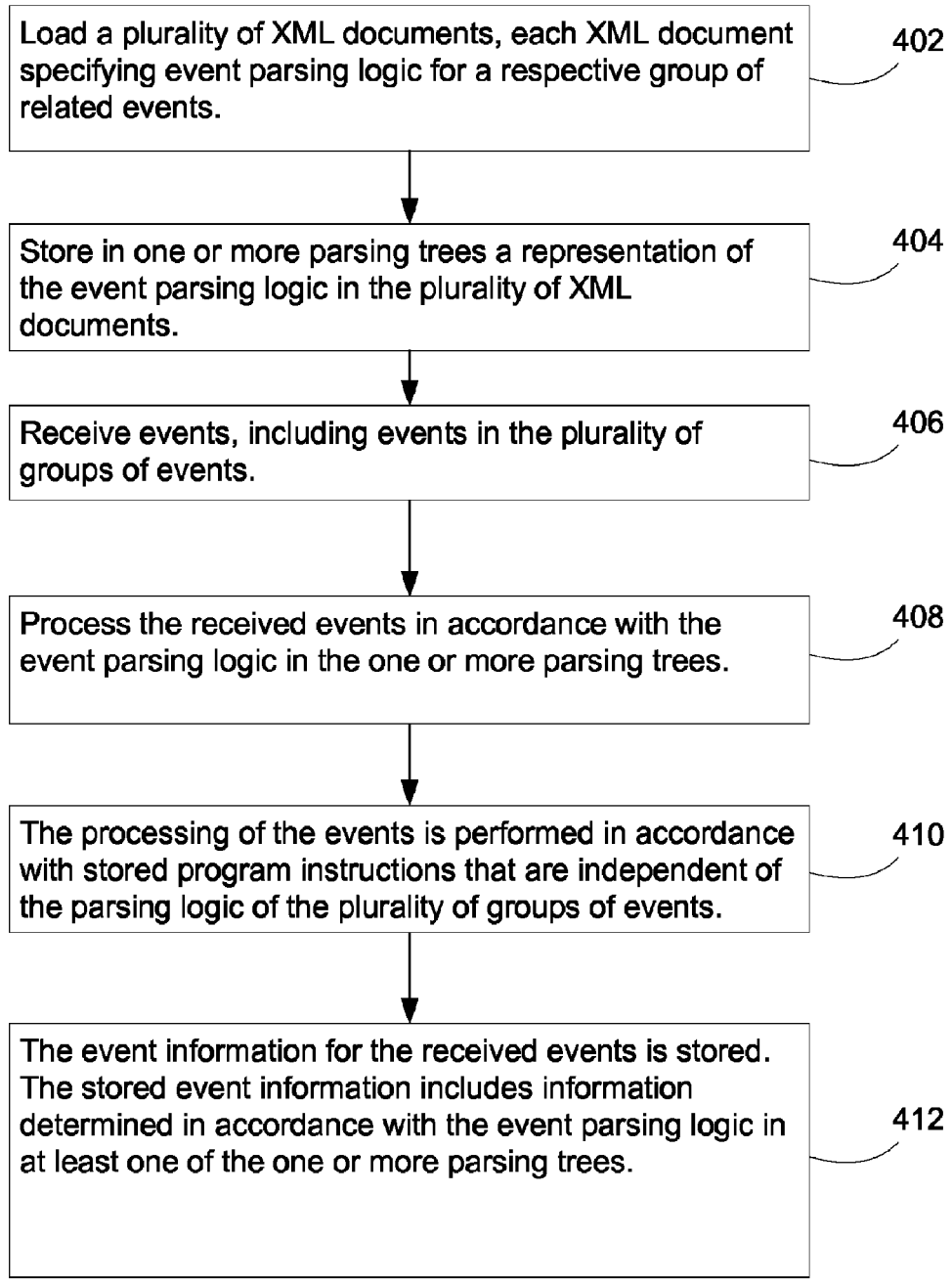

FIG. 4A illustrates a flow chart for parsing events, in accordance to some embodiments of the invention. Initially, a plurality of XML documents is loaded (402). Each XML document specifies event parsing logic for a respective group of related events. One or more parsing trees representing the event parsing logic in the plurality of XML documents is stored (404). The one or more parsing trees include event parsing logic for parsing events in a plurality of groups of events.

Events, including events in the plurality of events, are received (406). The received events are processed in accordance with the event parsing logic in the one or more parsing trees (408). Additionally, the processing of the events is performed in accordance with stored program instructions that are independent of the parsing logic of the plurality of groups of events (410). The event information for the received is stored in the memory of the server system 104 or in the memory of another client or server device 102 connected to the server system 104 through the communication network 106. The stored event information includes information determined in accordance with the event parsing logic in at least one of the one or more parsing trees (412).

Figure 4B:
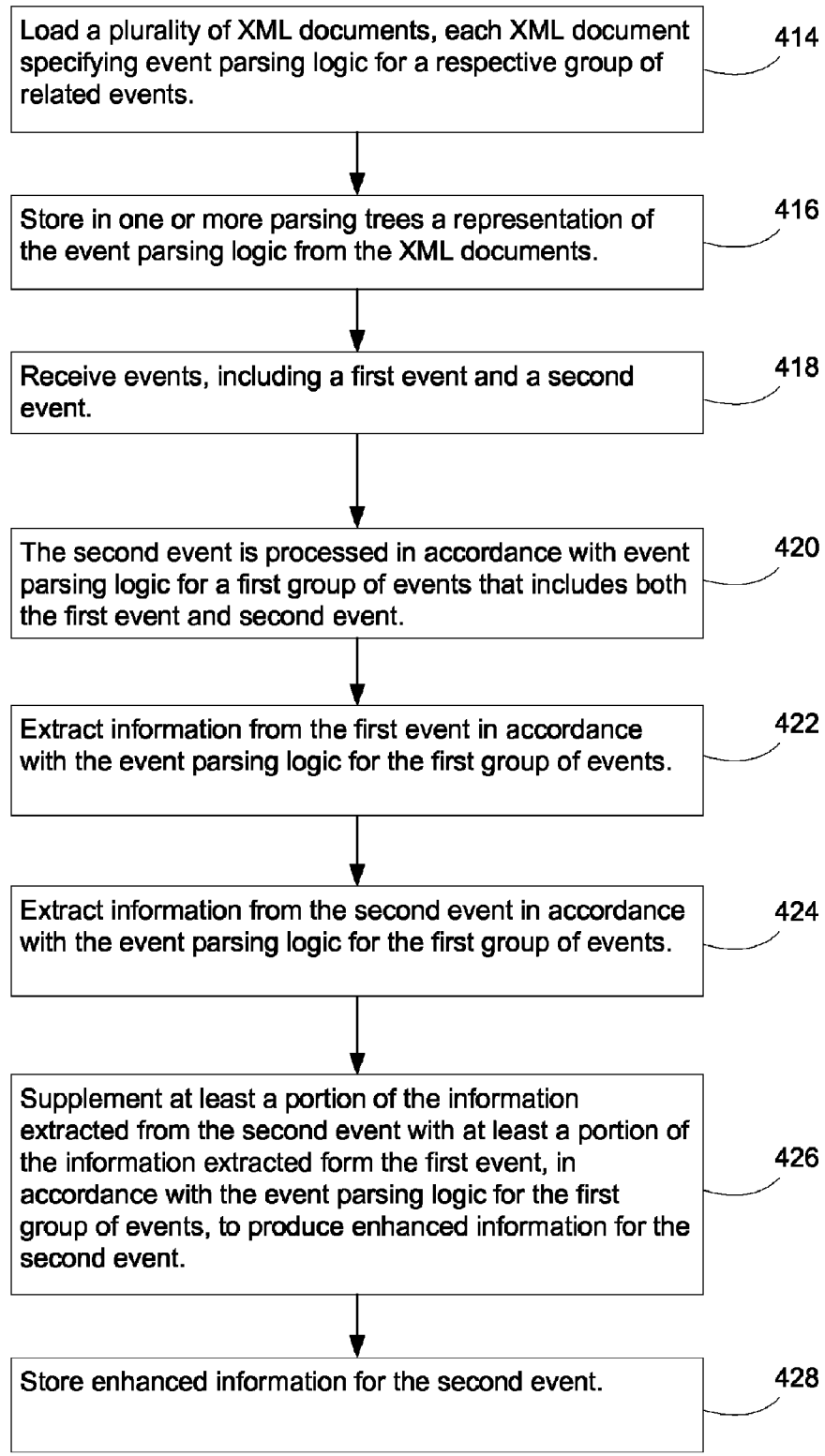

FIG. 4B illustrates a flow chart for parsing events, in accordance to some embodiments of the invention. Initially, a plurality of XML documents is loaded (414). Each XML document specifies event parsing logic for a respective group of related events. In some embodiments, as shown in FIG. 4C, the event parsing logic specified by a respective XML document includes conditional logic for conditionally revising information in the second event in accordance with information in the first event and second event (430). Alternately, as shown in FIG. 4C, the event parsing logic specified by a respective XML document includes conditional logic for conditionally supplementing the information extracted from the second event with information extracted from the first event when a condition specified in the XML document is satisfied (432). Alternatively, as shown in FIG. 4C, each XML document specifies one or more event attributes to be included in the enhanced information for the second event when a predefined precondition is met (433).

Figure 4D:
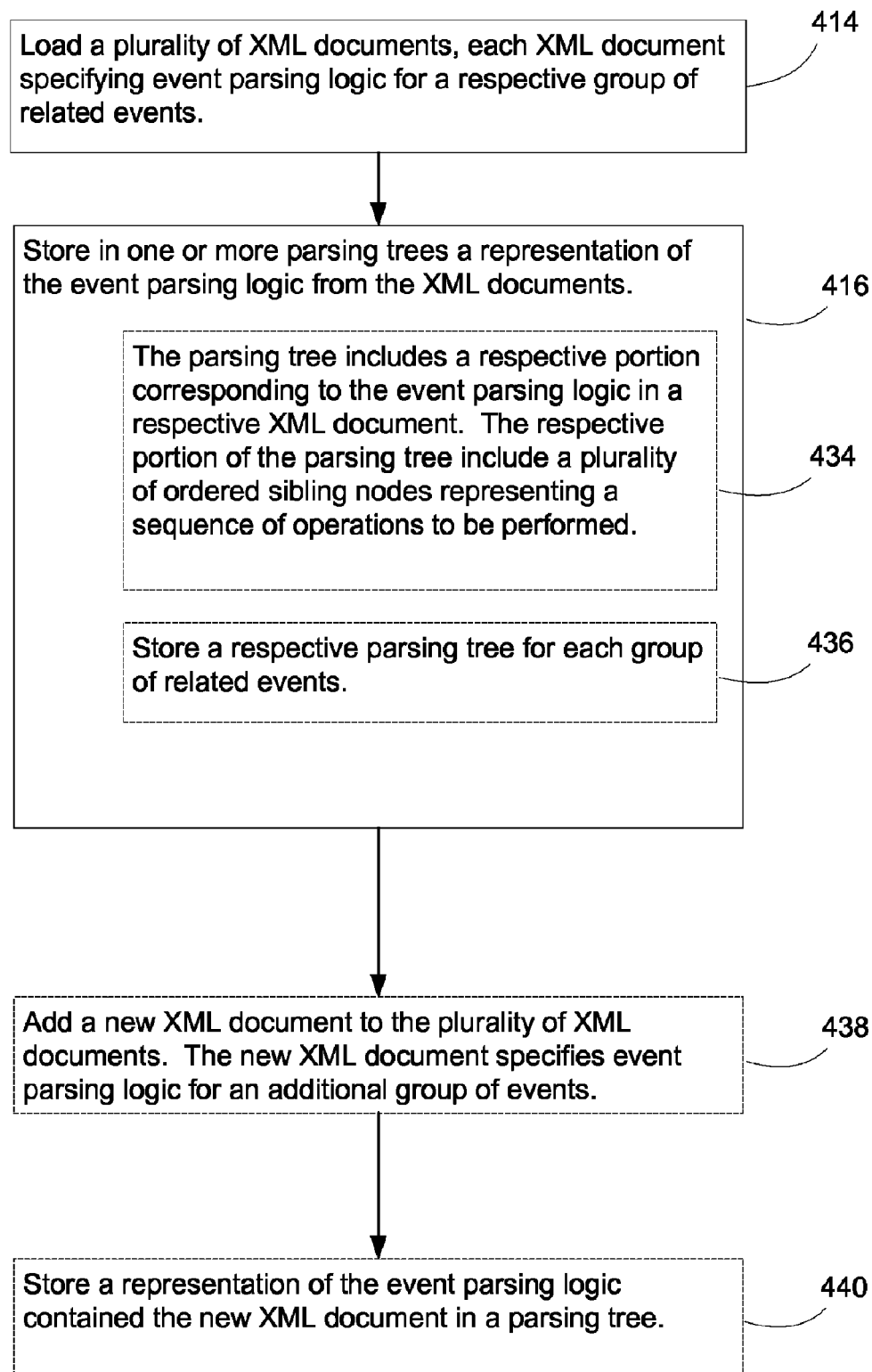

One or more parsing trees representing the event parsing logic in the plurality of XML documents is stored (416). The one or more parsing trees include event parsing logic for parsing events in a plurality of groups of events. In some embodiments, as shown in FIG. 4D, the parsing tree includes a respective portion corresponding to the event parsing logic in a respective XML document (434). The respective portion of the parsing tree includes a plurality of ordered sibling nodes representing a sequence of operations to be performed. Alternately, as shown in FIG. 4D, a respective parsing tree for each group of related events is stored (436).

In some embodiments, as shown in FIG. 4D, a new XML document is added to the plurality of existing XML documents (438). For example, the new XML document may be added (438) after a plurality (e.g., millions) of events have been processed using the parsing tree generated using previously loaded XML documents. The new XML document specifies event parsing logic for an additional group of events. A representation of the event parsing logic contained in the new XML document is stored in the form of a parsing tree (440). The process of converting the XML document into a parsing tree, or portion of a parsing tree is sometimes called compiling the XML document. As result, the one or more parsing trees in the parsing module 114 include the event parsing logic of both the new XML document and the previously loaded XML documents, and these parsing trees and then used to control the processing of events received subsequent to processing and compiling of the new XML document.

Figure 4E:
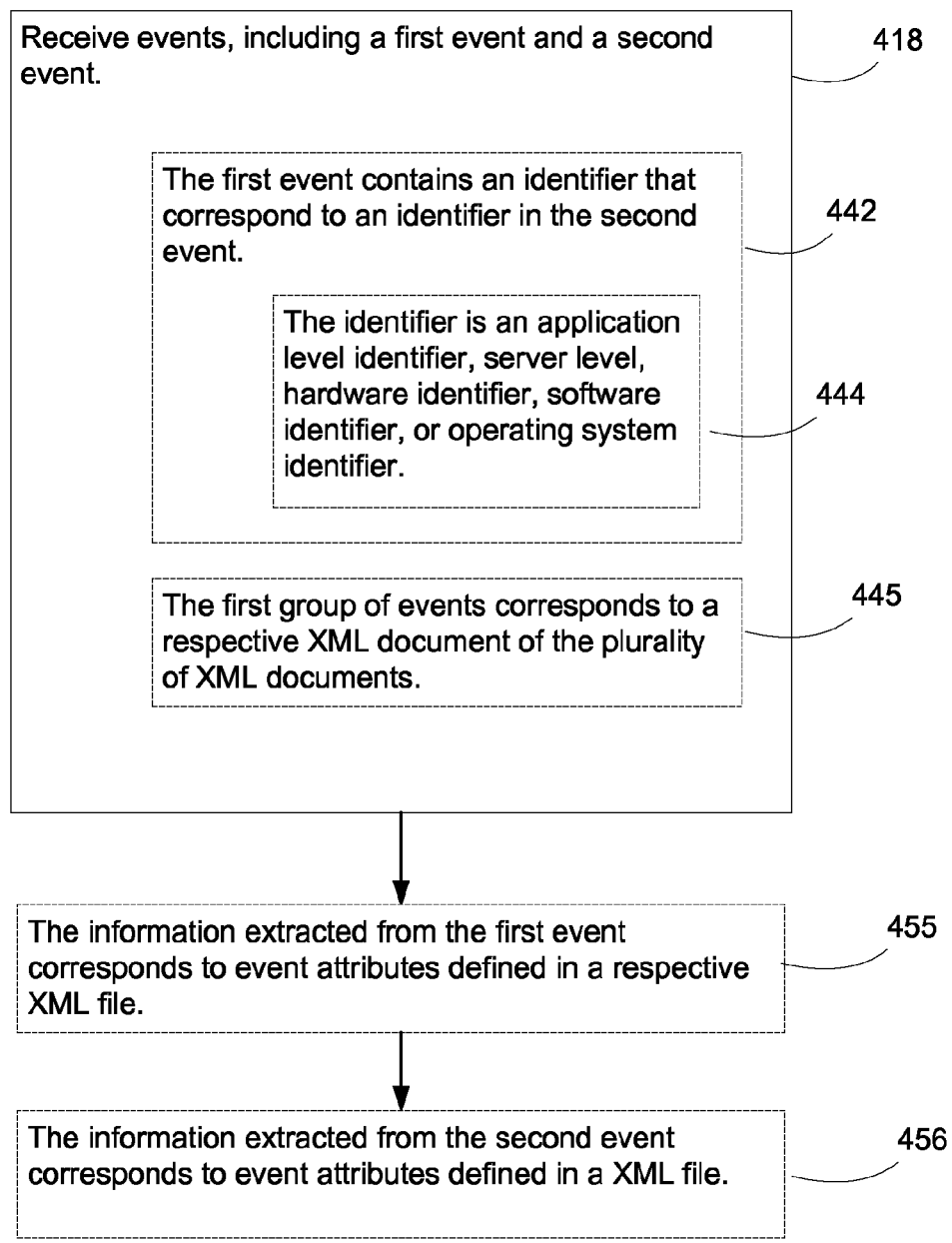

Events, including a first event and a second event, are received (418). In some embodiments, as shown in FIG. 4E, the first event contains an identifier that corresponds to an identifier in the second event (442). For example, the event identifier may be an application level identifier, server level identifier, hardware identifier, software identifier, or operating system identifier (444, FIG. 4E). Alternately, the event identifier that links two or more events may be the logon ID of a user. More generally, the linking information between events may differ for different groups or classes of events. In some embodiments, as shown in FIG. 4E, the first group of events corresponds to a respective XML document of the plurality of XML documents (445).

Figure 4F:
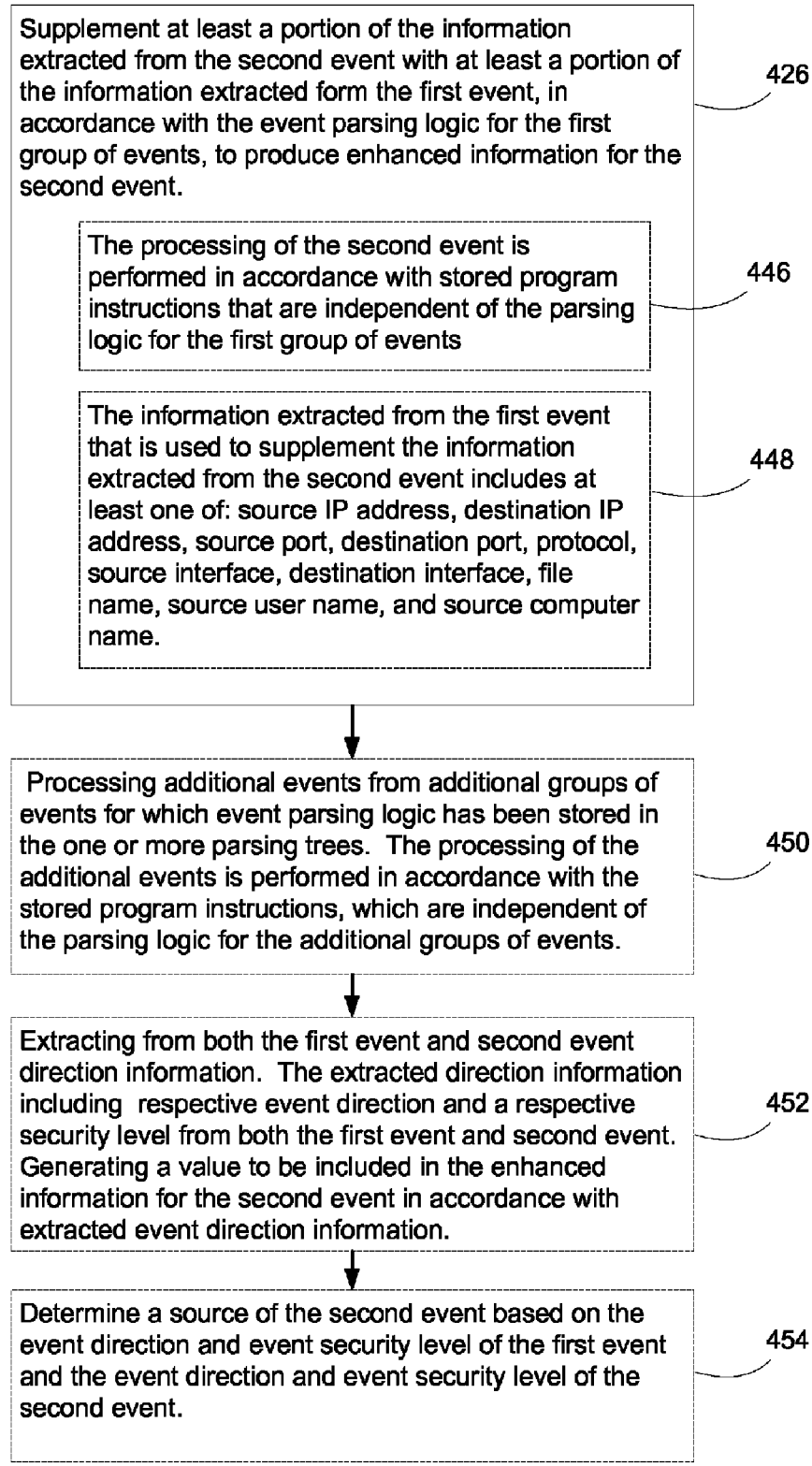

The second event is processed in accordance with event parsing logic for a first group of events that includes both the first event and second event (420, FIG. 4B). The processing includes extracting information from the first event in accordance with the event parsing logic for the first group of events (422). In some embodiments, as shown in FIG. 4E, the information extracted from the first event corresponds to event attributes defined in a respective XML file (455). The processing further includes extracting information from the second event in accordance with the event parsing logic for the first group of events (424). In some embodiments, as shown in FIG. 4E, the information extracted from the second event corresponds to event attributes defined in a respective XML file (456). At least a portion of the information extracted from the second event is supplemented with information extracted from the first event, in accordance with the event parsing logic for the first group of events, to produce enhanced information for the second event. In some embodiments, as shown in FIG. 4F, the processing of the second event is performed in accordance with stored program instructions (e.g., the parsing module 114) that are independent of the parsing logic for the first group of events (446). In some embodiments, as shown in FIG. 4F, the information extracted from the first event that is used to supplement the information extracted from the second event includes at least one of: source IP address, destination IP address, source port, destination port, protocol, source interface, destination interface, file name, source user name, and source computer name (448). More generally, information from the first event that is used to supplement the information in the second event is typically undetectable from the second event alone. Second, and possibly later events as well, include at least one value or parameter (which may be called the linking information) that is also included in the first event, enabling the parsing module to identify the first event and the information in the first event that is needed to generate enhanced event information for the second or later events.

In some embodiments, as shown in FIG. 4F, additional events are processed (450). The additional events are from additional groups of events for which event parsing logic has been stored in the one or more parsing trees (450). The processing of the additional events is performed in accordance with the stored program instructions which are independent of the parsing logic for the additional group of events (450).

In some embodiments, as shown in FIG. 4F, direction information is extracted from the first and second event (452). The extracted direction information includes a security level for both the first event and the second event (452). A value is generated in accordance with the extracted event direction information. The value is included in the enhanced information for the second event. In some embodiments, as shown in FIG. 4F, a source for the second event is determined based on the event direction and event security level of the first event and event direction and event security level of the second event (454).

The enhanced information for the second event is stored in memory of the server system 104 or memory of another client or device 102 connected to the server system 104 through the communication network 106 (428, FIG. 4B).

Figure 5:
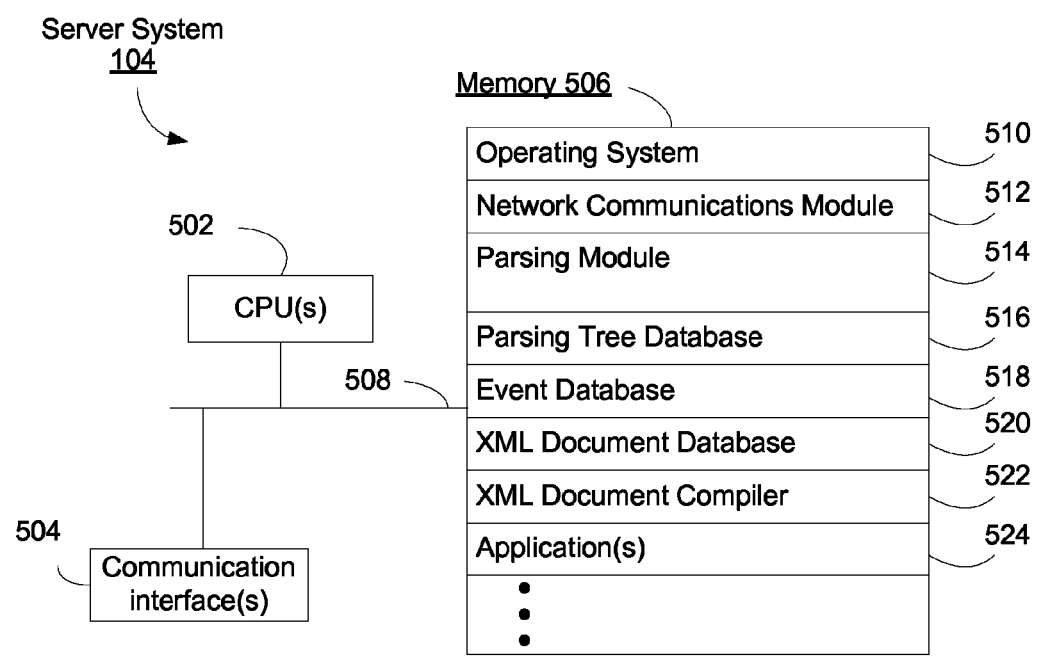
FIG. 5 is a block diagram illustrating a server system, in accordance with some embodiments of the invention.

FIG. 5 is a block diagram illustrating a server system 104 in accordance with one embodiment of the present invention. The server 104 typically includes one or more processing units (CPU's) 502, one or more network or other communications interfaces 504, memory 506, and one or more communication buses 508 for interconnecting these components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. Memory 506, or alternately the non-volatile memory device(s) within memory 506, comprises a computer readable storage medium. In some embodiments, memory 506 or the computer readable storage medium of memory 506 stores the following programs, modules and data structures, or a subset thereof:

an operating system 510 that includes procedures for handling various basic system services and for performing hardware dependent tasks;

a network communication module 512 that is used for connecting to other computers via the one or more communication network interfaces 504 (wired or wireless) and one or more communication networks, such as the Internet, other wide area networks, local area networks, metropolitan area networks, and so on;

a parsing module 514 to perform the parsing of events.

a parsing tree database 516 to store one or more parsing trees.

a event database 518 to store events.

an XML document database 520 to store XML documents.

an XML document compiler 522 to compile XML documents.

applications 524 that use the event information.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows an server system, FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., front end 108, parsing module 114, event database 116) shown separately in FIG. 5 could be implemented on single servers and single items could be implemented by one or more servers. The actual number of servers used to implement the server system 104 and how features are allocated among them will vary from one implementation to another, and may depend in part on the amount of data traffic that the system must handle during peak usage periods as well as during average usage periods.

Each of the methods described herein may be governed by instructions that are stored in a computer readable storage medium and that are executed by one or more processors of one or more servers. Each of the operations shown in FIGS. 2, 4A-4F, 6 and 7 may correspond to instructions stored in a computer memory or computer readable storage medium.

Figure 6A:
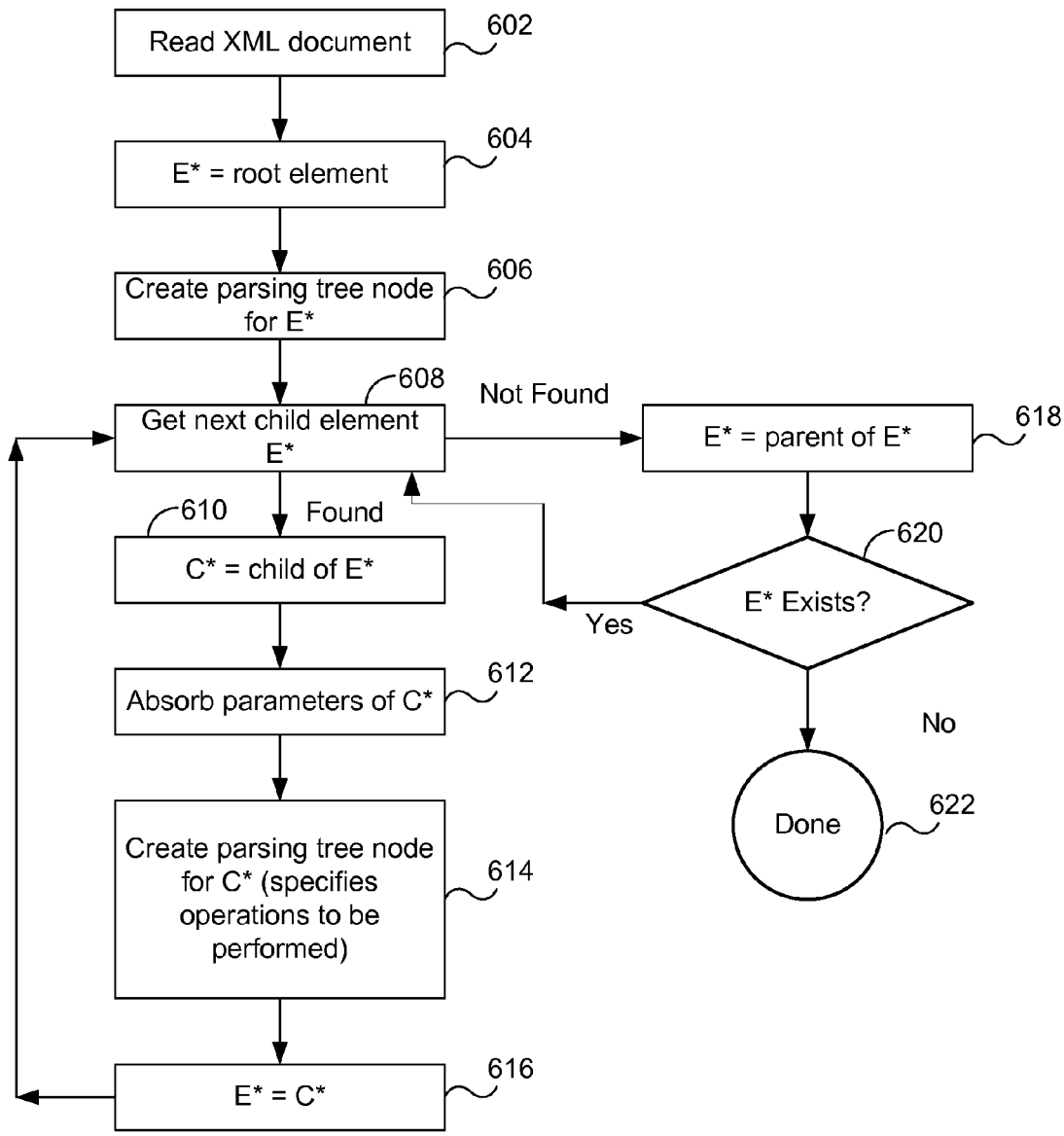
FIGS. 6A-6C are flow chart diagrams illustrating operation of an XML compiler, in accordance with some embodiments of the invention.

FIG. 6A illustrates the process of creating a logic tree from an XML document, in accordance to some embodiments. In this process, the elements of the XML document, which are hierarchically arranged, are traversed in a predefined order (e.g., depth first order), collecting information from the nodes as they are visited. As information is collected from each element of the XML document, a corresponding node is stored in a parsing tree.

Figure 6B:
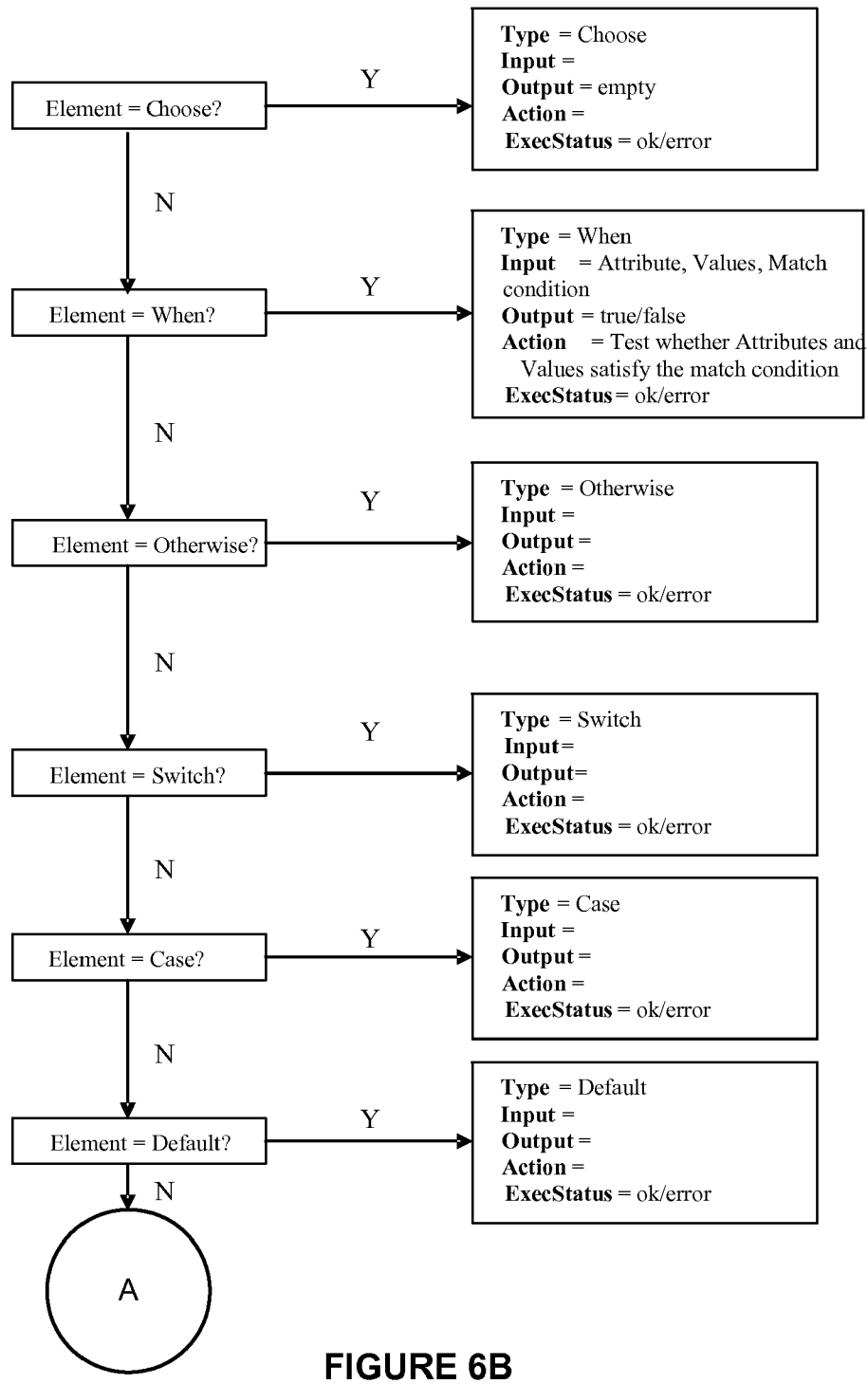
Figure 6C:
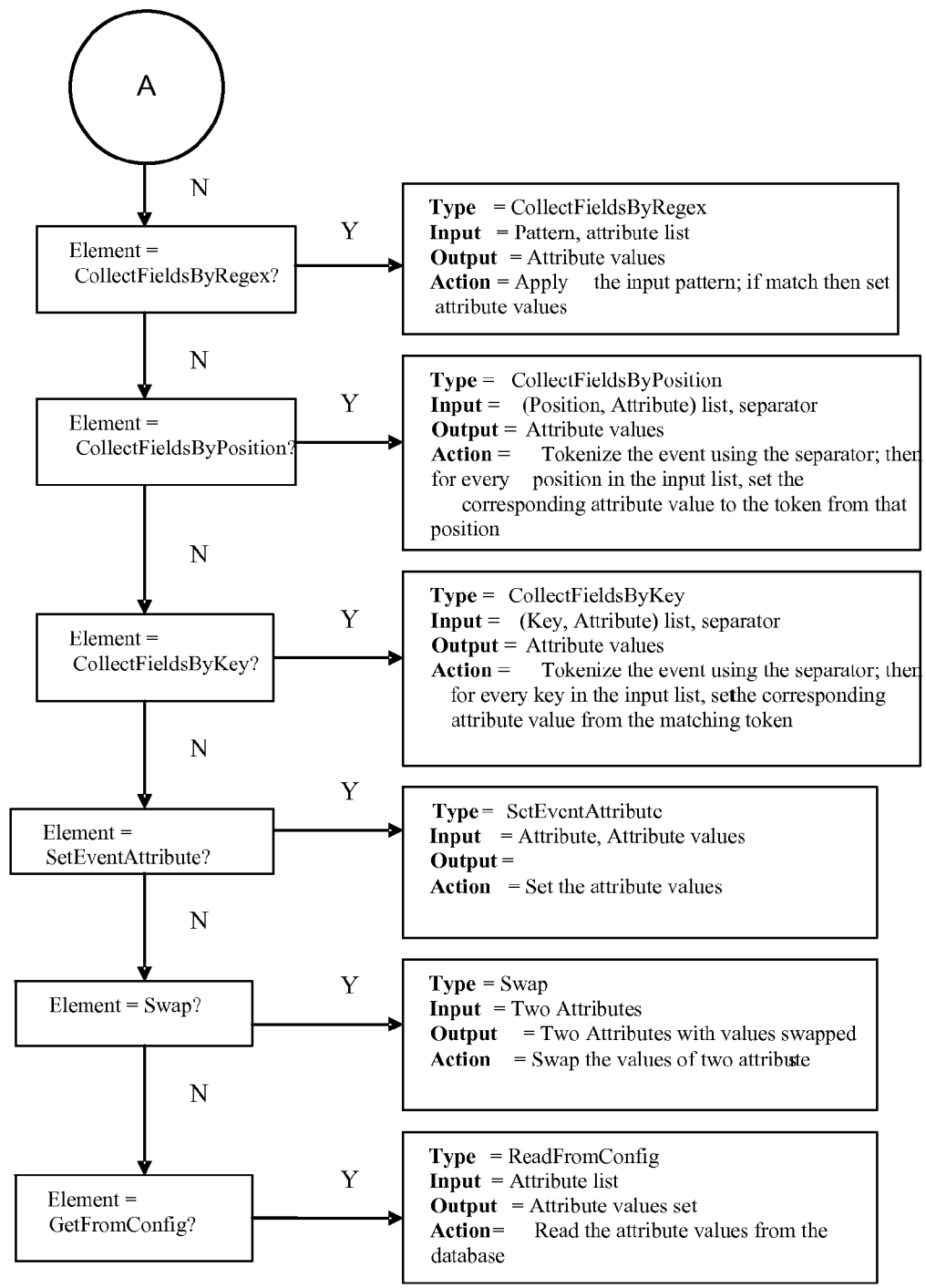

Initially, the XML compiler 601 reads an XML document at block 602. At block 604, E* is set to the root element. A parsing tree node is created for E* at block 606. The compiler then gets the next child element of E* at block 608. If there is a child element of E* the process moves to block 610 and sets C* to the child of E*. The parameters of C* are absorbed at block 612. A parsing tree node for element C* is created at block 614 using the parameters of C* absorbed at block 612. The parsing tree node created at block 614 specifies operations to be performed. FIGS. 6B and 6C are a flow chart representation of the process performed at block 614 for generating a respective parsing tree node for element C*. The compiler then sets E* to C* (i.e., E* is set to be the child of the previous element E*) at block 616 and goes back to block 608.

If at block 608 there was no child element of E* then the compiler moves to block 618. At block 618, E* is set to the parent of E* (i.e., the XML compiler moves back up the hierarchy of elements in the XML document). If the parent of E* exists at block 620 then the compiler moves to block 608.

Figure 7:
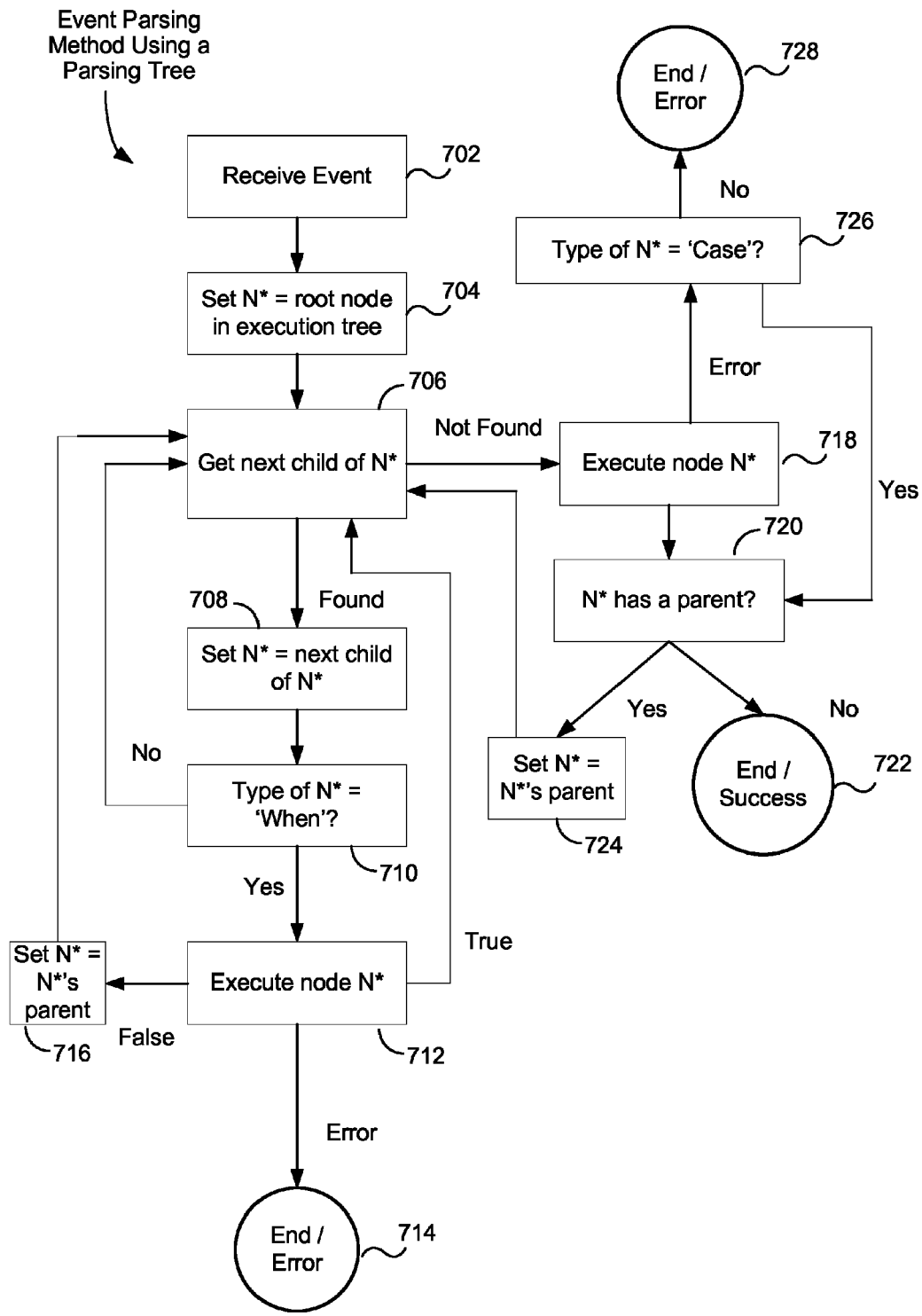
FIG. 7 is a flow chart diagram illustrating a method of parsing event messages, in accordance with some embodiments of the invention.

FIG. 7 illustrates an event parsing process in which a received event is parsed (and processed) using a parsing tree to guide the parsing of the event, in accordance to some embodiments. Initially, events are received at block 702. A parsing tree for a received event is identified, and N* is set to the root node of the identified parsing tree at block 704. The process then moves to block 706, and requests the next child node of N*. If there is a next child node of N* then the process moves to block 708 and N* is set to the next child node of N*. The process then moves to block 710 to check if N* is a "When" node. If N* is not a "When" node then the process moves back to block 706 to check to see if N *has a next child node. If at block 710, N* is a "When" node then the process moves to block 712 and executes the N* node. If, at block 712, the execution of the "when" node results in an error the process moves to block 714 and stops parsing. If, at block 712, the execution of the "when" node results in the conditions of the "when" node not being met then the process moves to block 716 and sets N* to the parent of N*. The process then moves back to block 706 and looks for the next child node of N*. If at block 712, the execution of the "when" node results in the conditions of the "when" node being met then the process moves back to block 706 and searches for the next child node of N*.

At block 706, if a the next child node of N* is not found then the process moves to block 718 where node N* is executed. If node N* is executed successfully the process moves to block 720 to check if node N* has a parent node. If at block 720 node N* does not have a parent node then the process moves to block 722 and ends processing. If at block 720 node N* does have a parent node then N* is set to the parent node of N* at block 724. The process then moves to block 706 to check if there is a next child node of N*.

At block 718, if the execution of node N* results in an error the process moves to block 726 to check whether node N* is a "case" node. If node N* is a "case" node then the process moves to block 720 to check if node N* has a parent node. If node N* is not a "case" node then the process moves to block 728 and discontinues parsing.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

TABLE 1

Generic Example of XML File for FIGS. 3A-3D

```xml
<eventParser name="ParserX">
<patternDefinitions>
    <event log patterns>
    <time patterns>
    <network patterns>
    <type patterns>
</patternDefinitions>
<parsingInstructions>
   <!--syslog header (Part 1) -->
<switch>
    <case1>
       < Parse header >
          <Match patterns> <event log patterns> <time patterns> <type patterns>
          </Match patterns>
       </Parse header>
       <setEventAttribute ="deviceTime"> DateTime </setEventAttribute>
    </case1>
    <case2>
       < Parse header >
          <Match patterns> <event log patterns> <time patterns><type patterns>
          </Match patterns>
       </Parse header>
       <setEventAttribute ="deviceTime"> DateTime </setEventAttribute>
    </case2>
    <caseN>
    < Parse header >
       <Match patterns> <event log patterns> <time patterns><type patterns>
       </Match patterns>
    </Parse header>
    <setEventAttribute ="deviceTime"> DateTime </setEventAttribute>
    </caseN>
</switch>
<setEventAttribute attr="eventType"> combinedMsgId </setEventAttribute>
<setEventAttribute attr="eventAction"> 0 </setEventAttribute>
<!--set event severity (Part 2) -->
<choose>
    <when test='$_severity IN parameter1'>
       <setEventAttribute attr="eventSeverity">Low</setEventAttribute>
    </when>
    <when test='$_severity IN parameter2'>
       <setEventAttribute attr="eventSeverity">High</setEventAttribute>
    </when>
    <when test='$_severity IN parameter3'>
       <setEventAttribute attr="eventSeverity">Medium</setEventAttribute>
    </when>
</choose>
<!-- message specific parsing (Part 3) -->
<!-- parsing for specific event VendorX-0001 -->
<choose>
    <when test='$eventType = "VendorX-0001"'>
       < Parse body >
          <Match patterns> <network patterns></Match patterns>
       </Parse body>
       <setEventAttribute attr ="result"> SourceName, DestinationName
       </setEventAttribute>
       <!-- check whether need to swap the src and dest attributes -->
       <choose>
          <when test = '$_direction = "inbound"'>
             <when test = '$_result = "GREATER"'>
                <swap> sourceAttributes, destinationAttributes </swap>
             </when>
          </when>
          <when test = '$_direction = "outbound"'>
             <when test = '$_result = "LESS"'>
                <swap> sourceAttributes, destinationAttributes </swap>
             </when>
          </when>
       </choose>
    </when>
<!-- parsing for event VendorX-0002 -->
    <when test='$eventType = " VendorX-0002"'>
       <collectFieldsRegex src="$_body">
          <Match patterns> <network patterns></Match patterns>
       </collectFieldsByRegex>
       <collectFieldsFromAnotherEvent AnotherEventType = "VendorX-0001">
          <when test = '$ipConnId = $AnotherEvent.ipConnId'>
             <setEventAttributes "X1"> value1 </setEventAttributes>
             <setEventAttributes "X2"> value2 </setEventAttributes>
```

TABLE 1-continued

Generic Example of XML File for FIGS. 3A-3D

```
                    setEventAttributes "XY"> valuey </setEventAttributes>
                </when>
            </collectFields FromAnotherEvent>
        </when>
    </choose>
    <!--post processing (Part4) -->
    <when test=IP_Protocol>
        <setEventAttribute attr="ipProto"> IpProto </setEventAttribute>
    </when>
    <when test='exist _dport'>
        <setEventAttribute attr="procName" >DestinationPort </setEventAttribute>
        <setEventAttribute attr="destIpPort"> DestIpPort </setEventAttribute>
    </when>
    <when test='exist _sport'>
        <setEventAttribute attr="srcIpPort"> SrcIpPort </setEventAttribute>
    </when>
</parsingInstructions>
</eventParser>
```

TABLE 2

Simplified Version of Exemplary XML File for FIGS. 3A-3D

```
<eventParser name="ParserX">
<!-- XML file for parsing following events
        <134>Nov 28 2007 17:20:48: %VendorX-6-1234: Built outbound TCP
connection 76118 for outside:207.68.178.45/80 to inside:192.168.20.31/3530
        <134>Nov 28 2007 17:22:08: %VendorX-6-5678: Teardown TCP connection
76118 for outside:207.68.178.45/80 to inside:192.168.20.31/3530 duration
0:01:05 bytes 6410 TCP Reset-I
end of event samples -->
<patternDefinitions>
        <!-- header patterns -->
        <pattern name="SyslogPRIPattern">LessThan OneOrMoreDigits GreaterThan
        </pattern>
        <pattern name="AllPattern"> AnyCharacter </pattern>
        <!-- time patterns -->
        <pattern name = "MonthPattern">
Jan|Feb|Mar|Apr|May|Jun|Jul|Aug|Sep|Oct|Nov|Dec|OneOrTwoDigitNum
        </pattern>
        <pattern name="DayPattern"> OneOrTwoDigitNum </pattern>
        <pattern name="TimePattern"> OneOrTwoDigitNum Colon OneOrTwoDigitNum
Colon OneOrTwoDigitNum </pattern>
        <pattern name="YearPattern"> TwoOrFourDigitNum </pattern>
        <!-- network patterns -->
            <pattern name="Ip4AddrPattern"> OneOrTwoOrThreeDigitNum Dot
OneOrTwoOrThreeDigitNum Dot OneOrTwoOrThreeDigitNum Dot
OneOrTwoOrThreeDigitNum </pattern>
<pattern name="IpPortPattern"> OneOrMoreDigitNum </pattern>
<pattern name="IpProtoPattern"> icmp|tcp|udp|http|ICMP|UDP|TCP|HTTP
</pattern>
<!-- type patterns -->
        <pattern name="StringPattern"> AllCharUptoFirstSpace </pattern>
        <pattern name="IntPattern"> OneOrMoreDigitNum </pattern>
        <pattern name="EventIdPrefixPattern">VendorX</pattern>
</patternDefinitions>
<parsingInstructions>
<!-- syslog header (Part 1) -->
    <switch>
        <case1>
            <ParseAndSetHeader>
                <MatchPatterns> [:SyslogPRIPattern] [mon:MonPattern]
[day:DayPattern] [year:YearPattern] [time:TimePattern] Colon Percent
[prefix:EventIdPrefixPattern] Dash [eventSeverity:IntPattern] Dash
[eventId:IntPattern] [eventBody:AllPattern]
                </MatchPatterns>
            </ParseAndSetHeader>
            <setEventAttribute attr = "deviceTime"> SetEventTime
(year,mon,day,time) </setEventAttribute>
        </case1>
        <case2>
            <ParseAndSetHeader>
                <MatchPatterns> [:syslogPRIPattern] [mon:MonPattern]
[day:DayPattern] [year:YearPattern] [time:TimePattern]
[reportDeviceAddr:Ip4AddrPattern] Colon Percent
```

TABLE 2-continued

Simplified Version of Exemplary XML File for FIGS. 3A-3D

```
[eventPrefix:EventIdPrefixPattern] Dash [eventSeverity:IntPattern] Dash
[eventId:IntPattern] [eventBody:AllPattern]
                </MatchPatterns>
            </ParseAndSetHeader>
            <setEventAttribute attr = "deviceTime"> SetEventTime
(year,mon,day,time) </setEventAttribute>
        </case2>
    </switch>
<setEventAttribute attr="eventType"> SetEventType
(eventPrefix, eventSeverity) </setEventAttribute>
<setEventAttribute attr="eventAction"> 0 </setEventAttribute>
<!-- set event severity (Part 2) -->
<choose>
    <when test = 'eventSeverity IN {5,6,7}'>
        <setEventAttribute attr="eventSeverity">Low</setEventAttribute>
    </when>
    <when test = 'eventSeverity IN {3,4}'>
        <setEventAttribute attr="eventSeverity">Medium</setEventAttribute>
    </when>
    <when test = 'eventSeverity IN {1,2}'>
        <setEventAttribute attr="eventSeverity">High</setEventAttribute>
    </when>
</choose>
<!-- message specific parsing (Part 3) -->
<choose>
    <when eventType = "VendorX-0001">
        <ParseAndSetBody src = "eventBody">
            <MatchPatterns> Built [connDirection:StringPattern]
[proto:IpProtoPattern] connection [connId:IntPattern] for
[srcIntf:Stringpattern] Colon [srcIpAddr:Ip4AddrPattern] ForwardSlash
[srcIpPort:IpPortPattern] to [destIntf:patIntfName] Colon
[destIpAddr:Ip4AddrPattern] ForwardSlash [destIpPort:IpPortPattern]
[:AllPattern]
            </MatchPatterns>
        </ParseAndSetBody>
        <setEventAttribute attr="intfSecCompResult"> compareIntfSecurityLevel
(srcIntf, destIntf) </setEventAttribute>
<choose>
    <when test = 'connDirection = "inbound"'>
        <when test = 'intfSecCompResult = "GREATER"'>
            <swap> srcIpAddr, destIpAddr</swap>
            <swap> srcIpPort, destIpPort</swap>
            <swap> srcIntf, destIntf</swap>
        </when>
    </when>
    <when test = 'connDirection = "outbound"'>
        <when test = 'intfSecCompResult = "LESS"'>
            <swap> srcIpAddr, destIpAddr</swap>
            <swap> srcIpPort, destIpPort</swap>
            <swap> srcIntf, destIntf</swap>
        </when>
    </when>
</choose>
</when>
<when eventType = "Vendor-0002">
<ParseAndSetBody>
<MatchPatterns> Teardown [ipProto:IpProtoPattern] connection
[connId:IntPattern] for [:StringPattern] Colon [:Ip4AddrPattern]
ForwardSlash [:IpPortPattern] to [:Stringpattern] Colon [:Ip4AddrPattern]
ForwardSlash [:IpPortPattern] duration [connDuration:TimePattern] bytes
[totalBytes:IntPattern] [:AllPattern] </MatchPatterns>
</ParseAndSetBody>
    <collectFieldsFromAnotherEvent AnotherEventType = "VendorX-0001">
    <when test = 'connId = AnotherEvent.connId'>
    <setEventAttributes attr = "srcIntf"> AnotherEvent.srcIntf
    </setEventAttributes>
    <setEventAttributes attr = "srcIpAddr"> AnotherEvent.srcIpAddr
    </setEventAttributes>
    <setEventAttributes attr = "srcIpPort"> AnotherEvent.srcIdpPort
    </setEventAttributes>
    <setEventAttributes attr = "destIntf"> AnotherEvent.destIntf
    </setEventAttributes>
    <setEventAttributes attr = "destIpAddr"> AnotherEvent.destIpAddr
    </setEventAttributes>
    <setEventAttributes attr = "destIpPort"> AnotherEvent.destIpPort
    </setEventAttributes>
</when>
</ collect Fields FromAnotherEvent>
```

TABLE 2-continued

Simplified Version of Exemplary XML File for FIGS. 3A-3D

```
</when>
</choose>
<!-- Post processing (Part4) -->
    <when test = 'exists ipProto'>
        <setEventAttribute attr="ipProto">convertStrToIntIpProto (ipProto)
</setEventAttribute>
    </when>
    <when test = 'exists destIpPort'>
        <setEventAttribute attr="destIpPort"> convertStrToIntIpPort
(destIpPort) </setEventAttribute>
    </when>
    <when test = 'exists srcIpPort'>
        <setEventAttribute attr="srcIpPort"> convertStrToIntIpPort
(srcIpPort) </setEventAttribute>
    </when>
</parsingInstructions>
</eventParser>
```

TABLE 3

Detailed Example of XML File for FIGS. 3A-3D

```
<eventParser name="VendorXParser">
<!--sample events
    <134>Nov 28 2007 17:20:48: %VendorX-6-0001: Built outbound TCP
connection 76118 for outside:207.68.178.45/80 to inside:192.168.20.31/3530
    <134>Nov 28 2007 17:22:08: %VendorX-6-0002: Teardown TCP connection
76118 for outside:207.68.178.45/80 to inside:192.168.20.31/3530 duration
0:01:05 bytes 6410 TCP Reset-I
-->
    <!-- pattern definitions -->
    <patternDefinitions>
        <!-- event log patterns -->
        <pattern name="gPatSyslogPRI"><![CDATA[<\d+>]]></pattern>
        <pattern name="gPatMesgBody"><![CDATA[.*]]></pattern>
        <pattern name = "gPatSyslogNGHeader">
<![CDATA[\w{3}\s+\d{1,2}\s\d{1,2}:\d{1,2}:\d{1,2}\s\d{1,3}\.\d{1,3}\.\d{1,3
}\.\d{1,3}]]>
        </pattern>
        <!-- time patterns -->
        <pattern name = "gPatMon">
<![CDATA[Jan|Feb|Mar|Apr|May|Jun|Jul|Aug|Sep|Oct|Nov|Dec|\d{1,2}]]>
        </pattern>
        <pattern name="gPatMonNum"><![CDATA[\d{1,2}]]></pattern>
        <pattern name="gPatDay"><![CDATA[\d{1,2}]]></pattern>
        <pattern name="gPatTime"><![CDATA[\d{1,2}:\d{1,2}:\d{1,2}]]></pattern>
        <pattern name="gPatYear"><![CDATA[\d{2,4}]]></pattern>
        <pattern
name="gPatTimeMSec"><![CDATA[\d{1,2}:\d{1,2}:\d{1,2}.\d{1,3}]]></pattern>
        <!-- network patterns -->
        <pattern
name="gPatIpV4Dot"><![CDATA[\d{1,3}\.\d{1,3}\.\d{1,3}\.\d{1,3}]]>
        </pattern>
        <pattern name="gPatIpPort"><![CDATA[\d+]]></pattern>
        <pattern
name="gPatProto"><![CDATA[icmp|tcp|udp|http|ICMP|UDP|TCP|HTTP]]></pattern>
        <!-- type patterns -->
        <pattern name="gPatWord"><![CDATA[\w+]]></pattern>
        <pattern name="gPatStr"><![CDATA[[^ ]*]]></pattern>
        <pattern name="gPatInt"><![CDATA[\d+]]></pattern>
        <pattern name="patMesgIdCommon"><![CDATA[ASA]]></pattern>
        <pattern name="patMesgIdSev"><![CDATA[\d]]></pattern>
        <pattern name="patIntfName"><![CDATA[[^ :]+]]></pattern>
    </patternDefinitions>
    <parsingInstructions>
    <!--syslog header (Part 1) -->
    <switch>
        <case>
            <collectFieldsByRegex src="$_rawmsg">
                <regex> <![CDATA[<:gPatSyslogPRI>?<_mon:gPatMon> <_day:gPatDay>
<_year:gPatYear> <_time:gPatTime>\s?:%<_idCommon:patMesgIdCommon>-
<_severity:patMesgIdSev>-<_idNum:gPatInt>:<_body:gPatMesgBody>]]>
                </regex>
            </collectFieldsByRegex>
            <setEventAttribute attr="deviceTime"> toDateTime($_mon, $_day,
```

TABLE 3-continued

Detailed Example of XML File for FIGS. 3A-3D

```
$_year, $_time)
            </setEventAttribute>
        </case>
        <case>
            <collectFieldsByRegex src="$_rawmsg">
                <regex>
                    <![CDATA[<:gPatSyslogPRI>?<_NGHeader:gPatSyslogNGHeader>
%<_idCommon:patMesgIdCommon>-<_severity:patMesgIdSev>-
<_idNum:gPatInt>:<_body:gPatMesgBody>]]>
                </regex>
            </collectFieldsByRegex>
            <collectFieldsByRegex src="$_NGHeader">
                <regex>
<![CDATA[<_mon:gPatMon>\s+<_day:gPatDay>\s<_time:gPatTime>\s<:gPatIpV4Dot>]
]>
                </regex>
            </collectFieldsByRegex>
            <setEventAttribute attr="deviceTime">toDateTime($_mon, $_day,
$_time)</setEventAttribute>
        </case>
    </switch>
    <setEventAttribute attr="eventType">combineMsgId($_idCommon, "-",
$_idNum)</setEventAttribute>
    <setEventAttribute attr="eventAction">0</setEventAttribute>
    <!-set event severity (Part 2) -->
    <choose>
        <when test='$_severity IN "5,6,7"'>
            <setEventAttribute attr="eventSeverity">Low</setEventAttribute>
        </when>
        <when test='$_severity = "1,2"'>
            <setEventAttribute attr="eventSeverity">High</setEventAttribute>
        </when>
        <when test='$_severity IN "3, 4"'>
            <setEventAttribute attr="eventSeverity">Medium</setEventAttribute>
        </when>
    </choose>
    <!-- message specific parsing (Part 3) -->
    <!-- parsing for event VendorX-0001 -->
    <choose>
        <when test='$eventType = "VendorX-0001"'>
            <collectFieldsByRegex src="$_body">
                <regex>
<![CDATA[Built <_direction:gPatStr> <_proto:gPatProto> connection
<ipConnId:gPatInt> for
<srcIntfName:patIntfName>:<srcIpAddr:gPatIpV4Dot>/<srcIpPort:gPatIpPort>
\(<postNATSrcIpAddr:gPatIpV4Dot>/<postNATSrcIpPort:gPatIpPort>\) to
<destIntfName:patIntfName>:<destIpAddr:gPatIpV4Dot>/<destIpPort:gPatIpPort>
\(<preNATDestIpAddr:gPatIpV4Dot>/<preNATDestIpPort:gPatIpPort>\)]]>
                </regex>
            </collectFieldsByRegex>
            <setEventAttribute attr="_result">
                compIntfSecVal($srcIntfName, $destIntfName)
            </setEventAttribute>
            <!-- check whether need to swap the src and dest attributes -->
            <choose>
                <when test = '$_direction = "inbound"'>
                    <when test = '$_result = "GREATER"'>
                        <swap>$srcIntfName, $destIntfName</swap>
                        <swap>$srcIpAddr, $destIpAddr</swap>
                        <swap>$srcIpPort, $destIpPort</swap>
                        <swap>$postNATSrcIpAddr, $preNATDestIpAddr</swap>
                        <swap>$postNATSrcIpPort, $preNATDestIpPort</swap>
                    </when>
                </when>
                <when test = '$_direction = "outbound"'>
                    <when test = '$_result = "LESS"'>
                        <swap>$srcIntfName, $destIntfName</swap>
                        <swap>$srcIpAddr, $destIpAddr</swap>
                        <swap>$srcIpPort, $destIpPort</swap>
                        <swap>$postNATSrcIpAddr, $preNATDestIpAddr</swap>
                        <swap>$postNATSrcIpPort, $preNATDestIpPort</swap>
                    </when>
                </when>
            </choose>
        </when>
        <!-- parsing for event VendorX-0002 -->
        <when test= '$eventType = "VendorX-0002"'>
            <collectFieldsRegex src="$_body">
```

TABLE 3-continued

Detailed Example of XML File for FIGS. 3A-3D

```
            <regex>
<![CDATA[Teardown <_proto:gPatProto> connection <ipConnId:gPatInt> for
<destIntfName:patIntfName>:<destIpAddr:gPatIpV4Dot>/<destIpPort:gPatIpPort>
to <srcIntfName:patIntfName>:<srcIpAddr:gPatIpV4Dot>/<srcIpPort:gPatIpPort>
duration <_connDuration:gPatTime> bytes <xchangedBytes:gPatInt>
<:gPatMesgBody>]]>
            </regex>
          </collectFieldsByRegex>
          <collectFieldsFromAnotherEventAnotherEventType = "VendorX-0001">
            <when test = '$ipConnId = $AnotherEvent.ipConnId'>
              <setEventAttribute
attr="destIntfName">$AnotherEvent.destIntfName</setEventAttribute>
              <setEventAttribute
attr="destIpAddr">$AnotherEvent.destIpAddr</setEventAttribute>
              <setEventAttribute
attr="destIpPort">$AnotherEvent.destIpPort</setEventAttribute>
              <setEventAttribute
attr="srcIntfName">$AnotherEvent.srcIntfName</setEventAttribute>
              <setEventAttribute
attr="srcIpAddr">$AnotherEvent.srcIpAddr</setEventAttribute>
              <setEventAttribute
attr="srcIpPort">$AnotherEvent.srcIpPort</setEventAttribute>
            </when>
          </collectFieldsFromAnotherEvent>
        <setEventAttribute
attr="durationMSec">calculateMSec($_connDuration)</setEventAttribute>
        </when>
      </choose>
      <!-post processing (Part4) -->
      <when test='exist _proto'>
        <setEventAttribute
attr="ipProto">convertStrToIntIpProto($_proto)</setEventAttribute>
      </when>
      <when test='exist _dport'>
        <setEventAttribute attr="procName">$_dport</setEventAttribute>
        <setEventAttribute
attr="destIpPort">convertStrToIntIpPort($_dport)</setEventAttribute>
      </when>
      <when test='exist _sport'>
        <setEventAttribute
attr="srcIpPort">convertStrToIntIpPort($_sport)</setEventAttribute>
      </when>
    </parsingInstructions>
</eventParser>
```

What is claimed is:

1. A computer-implemented method for collecting event information, comprising:

on a server system having one or more processors for executing one or more programs stored in memory of the server system so as to perform the method:

loading a plurality of XML documents, each XML document specifying event parsing logic for a respective group of related events;

storing in one or more parsing trees a representation of the event parsing logic in the plurality of XML documents, the one or more parsing trees including event parsing logic for parsing events in a plurality of groups of events;

receiving events, including events in the plurality of groups of events; and processing the received events in the plurality of groups of events in accordance with the event parsing logic in the one or more parsing trees, wherein the processing of the received events in the plurality of groups of events is performed in accordance with stored program instructions that are independent of the parsing logic for the plurality of groups of events, the processing including storing event information for the received events, wherein the stored event information for at least a subset of the received events includes information determined in accordance with the event parsing logic in at least one of the one or more parsing trees;

wherein the event parsing logic in the one or more parsing trees includes event parsing logic for a respective group of events, and processing the received events includes producing enhanced information for a respective event, and wherein producing enhanced information includes supplementing the information for the respective event with information from events in a respective group of events that includes the respective event.

2. A computer-implemented method for collecting event information, comprising:

on a server system having one or more processors for executing one or more programs stored in memory of the server system so as to perform the method:

loading a plurality of XML documents, each XML document specifying event parsing logic for a respective group of related events;

storing in one or more parsing trees a representation of the event parsing logic in the plurality of XML documents, the one or more parsing trees including event parsing logic for parsing events in a plurality of groups of events;

receiving events, including a first event and a second event;

processing the second event in accordance the event parsing logic for a first group of events that includes both the first event and second event, the processing of the second event including:

extracting information from the first event in accordance with the event parsing logic for the first group of events;

extracting information from the second event in accordance with the event parsing logic for the first group of events;

supplementing at least a portion of the information extracted from the second event with at least a portion of the information extracted from the first event, in accordance with the event parsing logic for the first group of events, to produce enhanced information for the second event; and storing the enhanced information for the second event in computer readable memory.

3. The method of claim 2, including adding a new XML document to the plurality of XML documents, the new XML document specifying event parsing logic for an additional group of events; and storing in a parsing tree a representation of the event parsing logic contained in the new XML document.

4. The method of claim 2, including storing a respective parsing tree for each group of related events, the respective parsing tree for controlling parsing of events in the respective group of related events.

5. The method of claim 2, wherein the processing of the second event is performed in accordance with stored program instructions that are independent of the parsing logic for the first group of events.

6. The method of claim 5, including processing additional events from additional groups of events for which event parsing logic has been stored in the one or more parsing trees, wherein the processing of the additional events is performed in accordance with said stored program instructions, which are independent of the parsing logic for the additional groups of events.

7. The method of claim 2, wherein the information extracted from the first event that is used to supplement the information extracted from the second event includes at least one of: source IP address, destination IP address, source port, destination port, protocol, source Interface, destination interface, file name, source user name, and source computer name.

8. The method of claim 2, wherein the event parsing logic specified by a respective XML document includes conditional logic for conditionally revising information in the second event in accordance with information in at the first event and second event.

9. The method of claim 2, wherein the event parsing logic specified by a respective XML document includes conditional logic for conditionally supplementing the information extracted from the second event with information extracted from the first event in accordance with when a condition specified in the XML document is satisfied.

10. The method of claim 2, the parsing tree including a respective portion corresponding to the event parsing logic in a respective XML document, the respective portion of the parsing tree including a plurality of ordered sibling nodes, representing a sequence of operations to be performed, in an order corresponding to the ordered sibling nodes, when processing a respective event in the group of related events corresponding to the respective XML document.

11. The method of claim 2, including executing an analysis procedure on the server system to analyze stored event information, including the stored enhanced information for the second event, to determine an operational status of a device or subsystem of the server system.

12. The method of claim 2, including executing an analysis procedure on the server system to analyze stored event information, including the stored enhanced information for the second event, to predict future problems with the operational status of the server system.

13. The method of claim 2, including executing an analysis procedure on the server system to analyze stored event information, including the stored enhanced information for the second event, to determine the operational status of a network device connected to the server.

14. The method of claim 2, wherein the events contain network traffic information.

15. The method of claim 2, wherein the first event contains an identifier that corresponds to an identifier in the second event.

16. The method of claim 15, wherein the identifier is an application level identifier, server level identifier, system level identifier, hardware identifier, software identifier, or operating system identifier.

17. The method of claim 2, wherein each XML document specifies one or more event attributes to be included in the enhanced information for the second event when a predefined precondition is met.

18. The method of claim 17, the first group of events corresponding to a respective XML document of the plurality of XML documents; the information extracted from the first event corresponding to event attributes defined in the respective XML file.

19. The method of claim 18, wherein the information extracted from the second event corresponds to event attributes defined in the XML file.

20. The method of claim 2, wherein the processing further includes:

extracting from both the first event and second event direction information, the extracted direction information including a respective event direction and a respective security level from both the first event and the second event, and generating a value to be included in the enhanced information for the second event in accordance with extracted event direction information.

21. The method of claim 20, further comprising determining a source of the second event based on the event direction and event security level of the first event and the event direction and event security level of the second event.

22. The method of claim 20, further comprising determining a destination event based on the event direction and event security level of the first event and the event direction and event security level of the second event.

23. A server system, comprising:

one or more processors;

memory storing one or more programs, the one or more programs including instructions, which when executed by the one or more processors, cause the server system to:

load a plurality of XML documents, each XML document specifying event parsing logic for a respective group of related events;

store in one or more parsing trees a representation of the event parsing logic in the plurality of XML documents, the one or more parsing trees including event parsing logic for parsing events in a plurality of groups of events;

receive events, including events in the plurality of groups of events; and process the received events in the plurality of groups of events in accordance with the event parsing logic in the one or more parsing trees, wherein the received events in the plurality of groups of events are processed in accordance with stored program instructions that are independent of the parsing logic for the plurality of groups of events, the processing of the received events includes storing event information for the received events, wherein the stored event information for at least a subset of the received events includes information determined in accordance with the event parsing logic in at least one of the one or more parsing trees;

wherein the instructions for processing the received events includes instructions for producing enhanced information for a respective event and wherein producing enhanced information includes supplementing the information for the respective event with information from events in a respective group of events that includes the respective event.

24. A computer readable storage medium storing the one or more programs including instructions, which when executed by one or more processors of a computer system, cause the computer system to:

load a plurality of XML documents, each XML document specifying event parsing logic for a respective group of related events;

store in one or more parsing trees a representation of the event parsing logic in the plurality of XML documents, the one or more parsing trees including event parsing logic for parsing events in a plurality of groups of events;

receive events, including events in the plurality of groups of events; and process the received events in the plurality of groups of events in accordance with the event parsing logic in the one or more parsing trees, wherein the received events in the plurality of groups of events are processed in accordance with stored program instructions that are independent of the parsing logic for the plurality of groups of events, the processing of the received events includes storing event information for the received events, wherein the stored event information for at least a subset of the received events includes information determined in accordance with the event parsing logic in at least one of the one or more parsing trees;

wherein the instructions for processing the received events includes instructions for producing enhanced information for a respective event, and wherein producing enhanced information includes supplementing the information for the respective event with information from events in a respective group of events that includes the respective event.

25. A server system, comprising:

one or more processors;

memory storing one or more programs, the one or more programs including instructions, which when executed by the one or more processors, cause the server system to:

load a plurality of XML documents, each XML document specifying event parsing logic for a respective group of related events;

store in one or more parsing trees a representation of the event parsing logic in the plurality of XML documents, the one or more parsing trees including event parsing logic for parsing events in a plurality of groups of events;

receive events, including a first event and a second event; and process the second event in accordance the event parsing logic for a first group of events that includes both the first event and second event, wherein the instructions, which when executed by the one or more processors, cause the server system to process the second event include instructions, which when executed by the one or more processors, cause the server system to:

extract information from the first event in accordance with the event parsing logic for the first group of events;

extract information from the second event in accordance with the event parsing logic for the first group of events;

supplement at least a portion of the information extracted from the second event with at least a portion of the information extracted from the first event, in accordance with the event parsing logic for the first group of events, to produce enhanced information for the second event; and store the enhanced information for the second event in computer readable memory.

26. A computer readable storage medium storing the one or more programs including instructions, which when executed by one or more processors of a computer system, cause the computer system to:

load a plurality of XML documents, each XML document specifying event parsing logic for a respective group of related events;

store in one or more parsing trees a representation of the event parsing logic in the plurality of XML documents, the one or more parsing trees including event parsing logic for parsing events in a plurality of groups of events;

receive events, including a first event and a second event;

process the second event in accordance the event parsing logic for a first group of events that includes both the first event and second event, wherein the instructions, which when executed by the one or more processors, cause the server system to process the second event include instructions, which when executed by the one or more processors, cause the server system to:

extract information from the first event in accordance with the event parsing logic for the first group of events;

extract information from the second event in accordance with the event parsing logic for the first group of events;

supplement at least a portion of the information extracted from the second event with at least a portion of the information extracted from the first event, in accordance with the event parsing logic for the first group of events, to produce enhanced information for the second event; and store the enhanced information for the second event in computer readable memory.

\* \* \* \* \*